(12) United States Patent
Kolb et al.

(10) Patent No.: US 7,032,324 B2
(45) Date of Patent: Apr. 25, 2006

(54) COATING PROCESS AND APPARATUS

(75) Inventors: William Blake Kolb, Woodbury, MN (US); Gary L. Huelsman, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/810,069

(22) Filed: Mar. 26, 2004

(65) Prior Publication Data

US 2004/0231186 A1  Nov. 25, 2004

Related U.S. Application Data

(63) Continuation-in-part of application No. 10/421,195, filed on Apr. 23, 2003, which is a continuation-in-part of application No. 09/960,131, filed on Sep. 21, 2001, now Pat. No. 6,553,689.

(60) Provisional application No. 60/274,050, filed on Mar. 7, 2001, provisional application No. 60/235,221, filed on Sep. 24, 2000, provisional application No. 60/235,214, filed on Sep. 24, 2000.

(51) Int. Cl.
*F26B 13/00* (2006.01)

(52) U.S. Cl. .................... 34/451; 34/430; 34/431; 34/559; 34/618

(58) Field of Classification Search .............. 34/430, 34/431, 432, 433, 434, 435, 451, 500, 503, 34/504, 507, 508, 509, 510, 540, 559, 207, 34/208, 209, 618, 629, 651; 162/199, 201, 162/252, 207, 194, 198
See application file for complete search history.

(56) References Cited

U.S. PATENT DOCUMENTS

| | | | |
|---|---|---|---|
| 1,494,830 A | | 8/1923 | Cook |
| 2,157,388 A | | 5/1939 | MacArthur |
| 2,815,307 A | | 12/1957 | Beck |
| 3,071,869 A | | 1/1963 | Latimer et al. |
| 3,408,748 A | | 11/1968 | Dunn |
| 3,452,447 A | | 7/1969 | Gardner |
| 3,542,640 A | * | 11/1970 | Adams et al. .............. 162/101 |
| 3,931,684 A | | 1/1976 | Turnbull et al. |
| 4,012,847 A | | 3/1977 | Rand |
| 4,051,278 A | | 9/1977 | Democh |
| 4,053,990 A | | 10/1977 | Bielinski |
| 4,223,450 A | | 9/1980 | Rothchild |
| 4,263,724 A | | 4/1981 | Vits |
| 4,268,977 A | | 5/1981 | Geiger |

(Continued)

FOREIGN PATENT DOCUMENTS

| | | |
|---|---|---|
| DE | 499 308 | 5/1930 |
| DE | 42 43 515 A1 | 6/1994 |

(Continued)

OTHER PUBLICATIONS

Schiffbauer, R.; "AbluftreinigungDurch Losemittelruckgewinnung", Linde Berichte Aus Technik Und Wissenschaft, Linde AG. Wiesbaden, DE, No. 64, 1990, pp. 45-52, XP000114324, Translation attached.

*Primary Examiner*—Kenneth Rinehart

(57) ABSTRACT

A web coating process and apparatus employing a coating applicator, dryer or curing station and web-handling equipment for conveying the web past the coating applicator and through the dryer. The web is enclosed from at least the coating applicator to the dryer or curing station in a close-coupled enclosure or series of close-coupled enclosures supplied with one or more streams of conditioned gas flowing at a rate sufficient to reduce materially the particle count or change materially a physical property of interest in a close-coupled enclosure.

49 Claims, 11 Drawing Sheets

U.S. PATENT DOCUMENTS

| | | |
|---|---|---|
| 4,369,584 A | 1/1983 | Daane |
| 4,462,169 A | 7/1984 | Daane |
| 4,752,217 A | 6/1988 | Justus |
| 4,894,927 A | 1/1990 | Ogawa et al. |
| 4,926,567 A | 5/1990 | Ogawa |
| 4,951,401 A | 8/1990 | Suzuki et al. |
| 5,168,639 A | 12/1992 | Hebels |
| 5,333,395 A | 8/1994 | Bulcsu |
| 5,528,839 A * | 6/1996 | Seidl .......................... 34/364 |
| 5,536,333 A | 7/1996 | Foote et al. |
| 5,579,590 A * | 12/1996 | Seidl et al. ................. 34/559 |
| 5,581,905 A | 12/1996 | Huelsman et al. |
| 5,694,701 A | 12/1997 | Huelsman et al. |
| 5,813,133 A | 9/1998 | Munter et al. |
| 5,906,862 A | 5/1999 | Yapel et al. |
| 5,980,697 A | 11/1999 | Kolb et al. |
| 6,047,151 A | 4/2000 | Carvalho et al. |
| 6,117,237 A | 9/2000 | Yapel et al. |
| 6,134,808 A | 10/2000 | Yapel et al. |
| 6,207,020 B1 | 3/2001 | Anderson |
| 6,256,904 B1 | 7/2001 | Kolb et al. |
| 6,280,573 B1 | 8/2001 | Lindsay et al. |
| 6,308,436 B1 | 10/2001 | Stipp |
| 6,375,874 B1 * | 4/2002 | Russell et al. ................. 264/28 |
| 6,431,858 B1 | 8/2002 | Rutz |
| 6,511,708 B1 | 1/2003 | Kolb et al. |
| 6,553,689 B1 | 4/2003 | Jain et al. |
| 6,562,412 B1 | 5/2003 | Fontaine |
| 6,656,017 B1 | 12/2003 | Jackson |

FOREIGN PATENT DOCUMENTS

| | | |
|---|---|---|
| GB | 713612 | 8/1954 |
| GB | 1 401 041 | 7/1975 |
| GB | 2 079 913 A | 1/1982 |
| JP | 09-073016 | 3/1997 |
| JP | 2001-170547 | 6/2001 |
| JP | 2003-093952 A | 4/2003 |
| JP | 2003-093953 A | 4/2003 |
| WO | WO 02/25193 A1 | 3/2002 |

* cited by examiner

◇ "-" setpoint
□ "-" low
△ "-" high
× "+" setpoint
✳ "+" low
○ "+" high

COATING PROCESS AND APPARATUS

CROSS-REFERENCE TO RELATED APPLICATIONS

This application is a continuation-in-part of and claims priority to U.S. patent application Ser. No. 10/421,195, filed Apr. 23, 2003, which in turn is a continuation-in-part of and claims priority to U.S. patent application Ser. No. 09/960,131, filed Sep. 21, 2001 (now U.S. Pat. No. 6,553,689 B2), which in turn claims priority to U.S. Provisional Application Ser. No. 60/235,214, filed Sep. 24, 2000, 60/235,221, filed Sep. 24, 2000, and 60/274,050, filed Mar. 7, 2001, all of which are hereby incorporated by reference in their entirety.

FIELD OF THE INVENTION

This invention relates to coating processes and equipment for treating moving substrates of indefinite length.

BACKGROUND

Moving substrates of indefinite length (viz., moving webs) can be coated in controlled environments when ordinary ambient air conditions might disrupt the coating process or pose a safety hazard. Typical controlled environments include clean rooms and the use of inert, low oxygen or saturated atmospheres. Clean rooms and special atmospheres require costly auxiliary equipment and large volumes of filtered air or specialty gases. For example, a typical clean room operation may require many thousands of liters per minute of filtered air.

Conventional practices for the removal and recovery of components during drying of coated webs generally utilize drying units or ovens. Collection hoods or ports are utilized in both closed and open drying systems to collect the solvent vapors emitted from the web or coating. Conventional open vapor collection systems generally utilize air handling systems that are incapable of selectively drawing primarily the desired gas phase components without drawing significant flow from the ambient atmosphere. Closed vapor collection systems typically introduce an inert gas circulation system to assist in purging the enclosed volume. In either system, the introduction of ambient air or inert gas dilutes the concentration of the gas phase components. Thus the subsequent separation of vapors from the diluted vapor stream can be difficult and inefficient.

Additionally, the thermodynamics associated with the conventional vapor collection systems often permit undesirable condensation of the vapor at or near the web or coating. The condensate can then fall onto the web or coating and adversely affect either the appearance or functional aspects of the finished product. In industrial settings, the ambient conditions surrounding the process and processing equipment may include extraneous matter. In large volume drying units, the extraneous matter may be drawn into the collection system by the large volumetric flows of conventional drying systems.

SUMMARY OF THE INVENTION

The disclosed invention includes a process and apparatus for coating a moving substrate of indefinite length in a controlled environment using low volumes of filtered air or specialty gases. The disclosed process and apparatus utilize a close-coupled enclosure that envelops the moving substrate from at least a coating applicator to a dryer or curing station, the close-coupled enclosure being supplied with one or more streams of conditioned gas flowing at a rate sufficient to reduce materially the close-coupled enclosure particle count. The invention thus provides in one aspect a process for coating a moving substrate of indefinite length comprising conveying the substrate past a coating applicator and to a dryer or curing station in a close-coupled enclosure or series of interconnected close-coupled enclosures while supplying the enclosure or series of enclosures with one or more streams of conditioned gas flowing at a rate sufficient to reduce materially the particle count(s) in a close-coupled enclosure.

The invention provides in another aspect an apparatus for coating a moving substrate of indefinite length comprising a coating applicator, dryer or curing station and substrate-handling equipment for conveying the substrate past the coating applicator and through the dryer or curing station, the substrate being enveloped from at least the coating applicator to the dryer or curing station in a close-coupled enclosure or series of close-coupled enclosures supplied with one or more streams of conditioned gas flowing at a rate sufficient to reduce materially the particle count(s) in a close-coupled enclosure.

The invention provides in yet another aspect a process for coating a moving substrate of indefinite length comprising conveying the substrate past a coating applicator and to a dryer or curing station in a close-coupled enclosure or series of interconnected close-coupled enclosures while supplying the enclosure or series of enclosures with one or more streams of conditioned gas flowing at a rate sufficient to cause a material change in a physical property of interest for the atmosphere in a close-coupled enclosure.

The invention provides in yet another aspect an apparatus for coating a moving substrate of indefinite length comprising a coating applicator, dryer or curing station and substrate-handling equipment for conveying the substrate past the coating applicator and through the dryer or curing station, the substrate being enveloped from at least the coating applicator to the dryer or curing station in a close-coupled enclosure or series of close-coupled enclosures supplied with one or more streams of conditioned gas flowing at a rate sufficient to cause a material change in a physical property of interest for the atmosphere in a close-coupled enclosure.

BRIEF DESCRIPTION OF THE DRAWING

The above, as well as other advantages of the disclosed invention will become readily apparent to those skilled in the art from the following detailed description when considered in light of the accompanying drawing in which.

Like reference symbols in the various figures indicate like elements. The elements in the drawing are not to scale.

DETAILED DESCRIPTION

Figure 1:
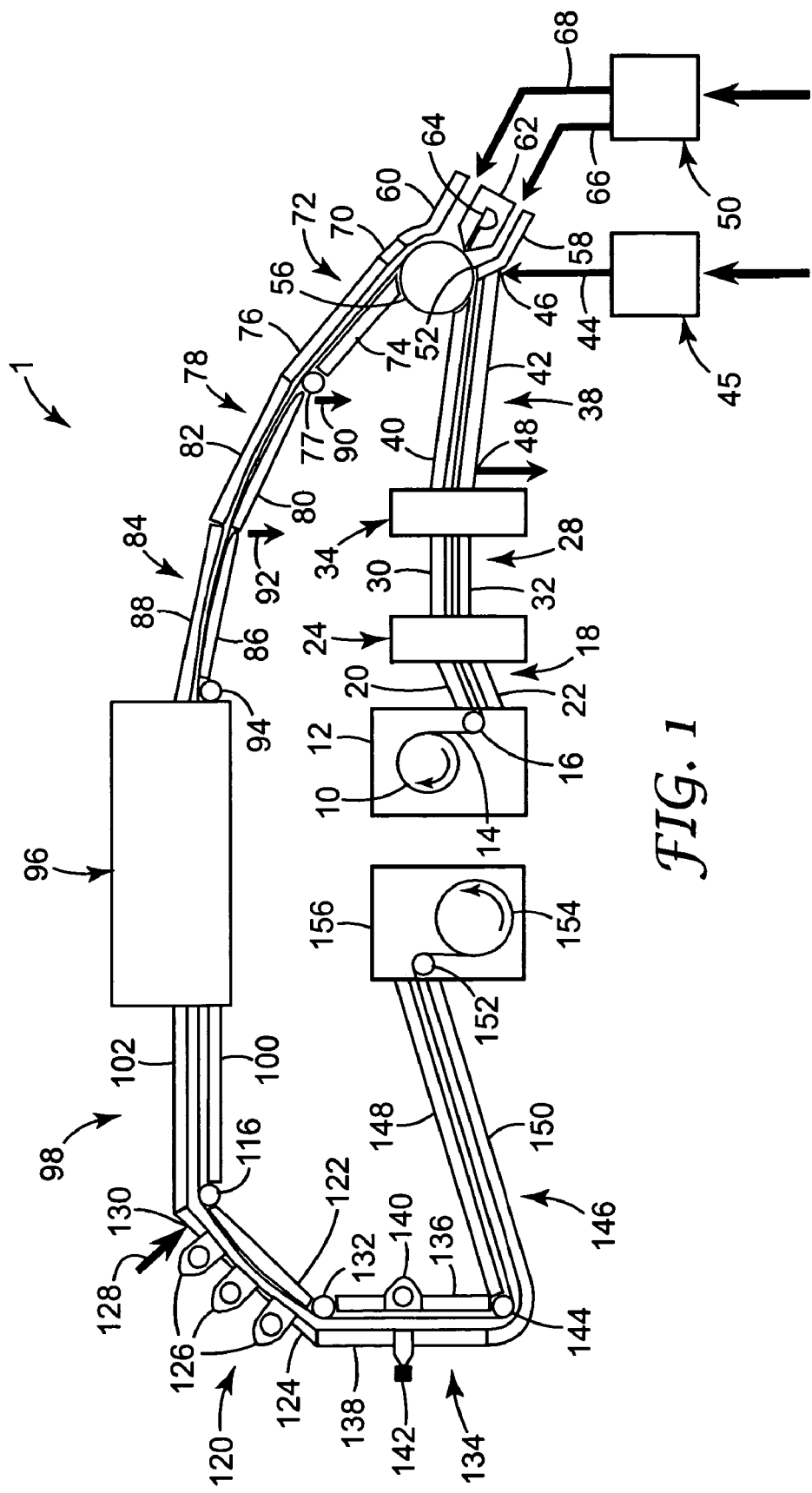
FIG. 1 is a schematic side sectional view of a disclosed controlled environment coating apparatus.

When used with respect to a moving substrate or an apparatus for coating such substrates, the words "downstream" and "upstream" refer respectively to the direction of substrate motion and its opposite direction.

When used with respect to an apparatus for coating a moving substrate or a component or station in such an apparatus, the words "leading" and "trailing" refer respectively to regions at which the substrate enters or exits the recited apparatus, component or station.

When used with respect to a moving substrate or an apparatus for coating such substrates, the word "width" refers to the length perpendicular to the direction of substrate motion and in the plane of the substrate.

When used with respect to an apparatus for coating a moving substrate or a component or station in such an apparatus, the phrase "coating applicator" refers to a device that applies a continuous or discontinuous layer of a coating composition to the substrate.

When used with respect to an apparatus for coating a moving substrate or a component or station in such an apparatus, the word "dryer" refers to a device that employs heat or other energy to remove one or more volatile liquids from a coating composition.

When used with respect to an enclosed apparatus for coating a moving substrate or an enclosed component or station in such an apparatus, the phrase "appreciable drying" refers to drying sufficient to render a coating detectably less sensitive to contamination from airborne particulates.

When used with respect to a moving substrate or an apparatus for coating such substrates, the word "solidification" refers to hardening, curing, crosslinking or other alteration in the coating sufficient to cause a noticeable phase change in at least a portion of the coating.

When used with respect to an apparatus for coating a moving substrate or a component or station in such an apparatus, the phrase "curing station" refers to a device that employs heat, light, microwaves, electron beam or other energy source to accomplish solidification of a coating composition.

When used with respect to an enclosed apparatus for coating a moving substrate or an enclosed component or station in such an apparatus, the phrase "appreciable curing" refers to curing sufficient to render a coating detectably less sensitive to contamination from airborne particulates.

When used with respect to an apparatus for coating a moving substrate or a component or station in such an apparatus, the phrase "web-handling equipment" refers to a device or devices that transport the substrate through the apparatus.

When used with respect to an enclosed apparatus for coating a moving substrate or an enclosed component or station in such an apparatus, the phrase "control surface" refers to a surface that is generally parallel to a major face of the substrate and located sufficiently close to the substrate so that an atmosphere that may affect coating quality is present between the control surface and the substrate. A control surface may include for example an enclosure housing, a separate plate, the walls of a slit, or other surface having an appreciable area generally parallel to a major face of the substrate.

When used with respect to an enclosed apparatus for coating one or both sides of a moving substrate or an enclosed component or station in such an apparatus, the word "headspace" refers to the distance from the substrate to a nearby control surface measured on the coated side perpendicular to the substrate.

When used with respect to an enclosed apparatus for coating one side of a moving substrate or an enclosed component or station in such an apparatus, the word "footspace" refers to the distance from the substrate to a nearby control surface measured on the uncoated side perpendicular to the substrate.

When used with respect to an enclosed apparatus for coating a moving substrate or an enclosed component or station in such an apparatus, the phrase "close-coupled enclosure" refers to an enclosure whose average headspace plus average footspace throughout the enclosure is no greater than about 30 cm and that at its upstream or downstream end is sealed with respect to the substrate or connected to a cabinet, enclosed component, enclosed station or other enclosure.

When used with respect to an enclosed apparatus for coating one side of a moving substrate or an enclosed component or station in such an apparatus, the word "overlying" refers to an apparatus, component or station on the coated or to be coated side of the substrate.

When used with respect to an enclosed apparatus for coating one side of a moving substrate or an enclosed component or station in such an apparatus, the word "underlying" refers to an apparatus, component or station on the uncoated side of the substrate.

When used with respect to an enclosed apparatus for coating a moving substrate or an enclosed component or station in such an apparatus, the phrase "conditioned gas" refers to gas that is different from the ambient air surrounding the apparatus in at least one property of interest.

When used with respect to an enclosed apparatus for coating a moving substrate or an enclosed component or station in such an apparatus, the phrase "particle count" refers to the number of 0.5 µm or larger particles in a volume of 28.3 liters.

When used with respect to a physical property of interest (e.g., the particle count) for the atmosphere in an enclosed apparatus for coating a moving substrate or an enclosed component or station in such an apparatus, the word "material" refers to at least a 50% reduction or increase in the property of interest compared to the ambient air surrounding the apparatus, component or station.

When used with respect to an enclosed apparatus for coating a moving substrate or an enclosed component or station in such an apparatus, the phrase "negative pressure" refers to pressure below that of the ambient air surrounding the apparatus, component or station, and the phrase "positive pressure" refers to a pressure above that of the ambient air surrounding the apparatus, component or station.

When used with respect to an apparatus for coating a moving substrate or a component or station in such an apparatus, the phrase "pressure gradient" refers to a pressure differential between an interior portion of the apparatus, component or station and that of the ambient air surrounding the apparatus, component or station.

A webline 1 employing a nearly end-to-end implementation of the disclosed close-coupled enclosure is shown in FIG. 1. Unwind reel 10 and takeup reel 154 are located inside cabinets 12 and 156. Cabinets 12 and 156 typically do not benefit from employing a close-coupled enclosure, and instead desirably have a sufficiently roomy and uncluttered interior to house large uncoated or coated web rolls and permit easy roll changeover and transport. Cabinets 12 and 156 may be unventilated, ventilated with ambient air, or supplied with a suitable conditioned gas stream as desired. Uncoated web 14 passes from unwind reel 10 over transport roll 16 and into a first close-coupled enclosure 18 whose operation is explained in more detail below. Close-coupled enclosure 18 includes underlying control surface 20 and overlying control surface 22 which each lie in close proximity to the major surfaces of web 14. Web 14 next passes into web cleaning apparatus 24. Apparatus 24 may employ any of a variety of methods that will be familiar to those skilled in the art (e.g., plasma treatment or tacky rolls) to remove unwanted debris, surface oils or other contaminants from at least one surface of web 14. Apparatus 24 may be unventilated or supplied with a suitable conditioned gas stream as desired. In the latter instance the conditioned gas may flow upstream or downstream into neighboring enclosures. Web 14 next passes from cleaning apparatus 24 through a second close-coupled enclosure 28 whose underlying control surface 30 and overlying control surface 32 lie in close proximity to the major surfaces of web 14, and into priming apparatus 34. Apparatus 34 may employ any of a variety of methods that will be familiar to those skilled in the art (e.g., corona treatment) to make at least one surface of web 14 receptive to a subsequently-applied coating. Apparatus 34 may be unventilated or supplied with a suitable conditioned gas stream as desired. In the latter instance the conditioned gas may flow upstream or downstream into neighboring enclosures.

The cleaned and corona-treated web 14 next passes from corona treater 34 through a third close-coupled enclosure 38 whose underlying control surface 40 and overlying control surface 42 lie in close proximity to the major surfaces of web 14. Close-coupled enclosure 38 may be supplied with a conditioned gas stream 44 that flows into close-coupled enclosure 38 through downstream inlet 46 and exits through upstream outlet 48. Conditioned gas stream 44 differs from the ambient air in at least one property of interest, e.g., a different chemical composition due to the absence or presence of one or more gases (including humidity), a different (e.g., lower) particle count, or a different temperature. For example, humidifier/dehumidifier 45 may be used to alter the moisture content of conditioned gas stream 44 and to add or remove moisture to or from web 14.

Web 14 next moves past seal 52 and into a fourth close-coupled enclosure 54. Close-coupled enclosure 54 is bounded in part by seal 52, backing roll 56 and lower and upper clamshell housings 58, 60, thereby forming a die enclosure system. Further details regarding die enclosure systems may be found in U.S. Pat. No. 6,117,237 (Yapel et al.), the disclosure of which is incorporated herein by reference. Coating die 62 applies one or more layers of coating material 64 to one major side of web 14. The other major side of web 14 contacts backing roll 56. Backing roll 56 may be heated using an appropriate temperature control system (not shown in FIG. 1), to provide, for example, improved applied coating quality or improved solidification control. Close-coupled enclosure 54 is supplied with conditioned gas streams 66, 68. Use of a vacuum (not shown in FIG. 1) upstream from coating die 62 in addition to conditioned gas stream 66 may help stabilize the applied coating. An inspection or measurement station 70 located downstream from coating die 62 (e.g., at or near the trailing edge of upper housing 60), may be in the form of a transparent viewing window and illumination device for the operator to monitor coating quality, or may be any of a number of other devices or instruments that will be familiar to those skilled in the art.

Following coating deposition the coating will undergo wetting, spreading and eventual solidification. Solidification may be brought about, for example, by measures including chilling, heating, reaction, or drying. Appropriate control of these processes and the avoidance of coating contamination or disturbance can be facilitated through the use of one or more additional close-coupled enclosures. For example, web 14 may pass from backing roll 56 to transport roll 77 through a fifth close-coupled enclosure 72 whose underlying control surface 74 and overlying control surface 76 lie in close proximity to the major surfaces of web 14 in a "flat" gap arrangement. Close-coupled enclosure 72 may be supplied with a separate conditioned gas stream (not shown in FIG. 1) that flows into close-coupled enclosure 72 through an inlet (not shown in FIG. 1). A separate conditioned gas stream may not be needed in close-coupled enclosure 72. For example, close-coupled enclosure 72 may simply receive a portion of the conditioned gas stream 68 that moves between web 14 and housing 60 in the direction of motion of web 14. Close-coupled enclosure 72 may be, for example, a leveling zone that allows a non-uniformly applied coating to spread and self-level. The operating conditions in such a leveling zone typically will be set to minimize the drying rate by minimizing mass transfer from the coating surface to the surrounding close-coupled enclosure (e.g., by controlling the conditioned gas velocity, humidity or temperature). This acts to keep the coating viscosity low and provides assistance in leveling non-uniformities in the coated film. In some processes it may be desirable to carry out solidification as fast as possible before flow-induced uniformities can form. In such processes the close-coupled enclosure zone operating conditions downstream from the coater may be set for high drying rates. Close-coupled enclosure 72 may also be configured to add an additional component or layer to the coating, or to provide a dry environment that may discourage "blushing" in the coating.

Further controlled drying or solvent recovery may be accomplished using sixth and seventh close-coupled enclosures 78, 84 whose respective underlying control surfaces 80, 86 and overlying control surfaces 82, 88 lie in close proximity to the major surfaces of web 14. Close-coupled enclosures 78, 84 may be gap drying systems such as those described in U.S. Pat. Nos. 4,980,697, 5,581,905, 5,694,701, 5,813,133, 6,047,151 and 6,134,808, the disclosures of which are incorporated by reference in their entirety. When close-coupled enclosures 78, 84 are gap drying systems, then condensed solvent streams 90, 92 can be collected at the lower ends of close-coupled enclosures 78, 84.

Figure 2:
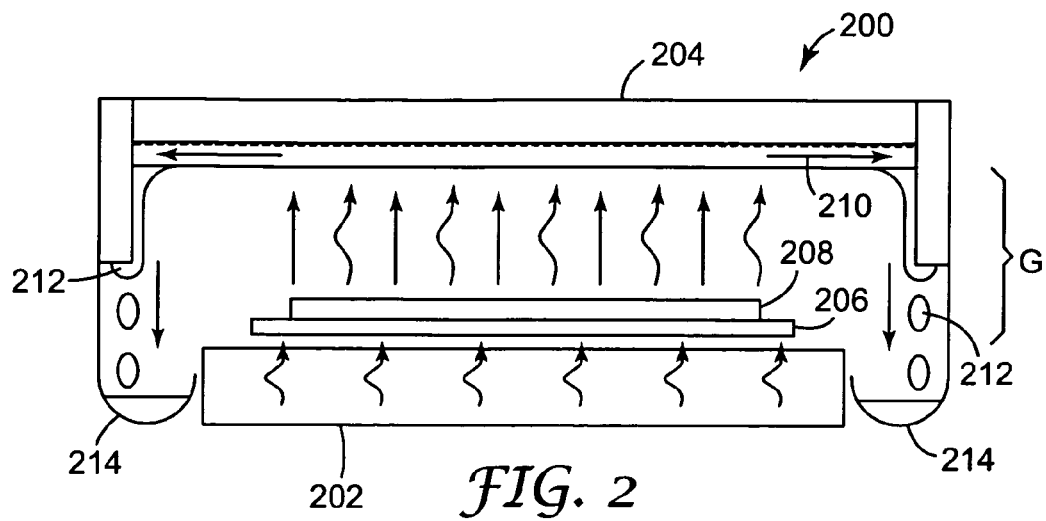
FIG. 2 is a schematic cross sectional view of a gap dryer.

FIG. 2 shows a schematic cross-sectional view of gap dryer 200. Dryer 200 has a hot plate 202 and cold plate 204 separated by a small gap G. Web 206 bearing coating 208 may be dried by passing it over hot plate 202 which supplies energy to evaporate solvents from coating 208. Cold plate 204 provides a driving force for condensation and solvent vapor transport across gap G. Cold plate 204 is provided with a structured (e.g., grooved) surface 210 that prevents the condensed solvent liquid from dripping back onto the coated surface. Instead, the condensed solvent streams 212 are "pumped" off cold plate 204 and into collection troughs 214, which may be connected to a solvent recovery system (not shown in FIG. 2). Thus both drying and solvent recovery may occur simultaneously as web 206 is transported through gap G. Transport of a web through such a gap drying system may be facilitated by employing radiused plate web floatation as described in U.S. Pat. No. 6,511,708 (Kolb et al.). Web floatation over radiused plates can provide a controllable and scratch-free system for supporting and heating a moving substrate while minimizing (e.g., to 4 mm or less) the footspace.

Referring again to FIG. 1, web 14 exits close-coupled enclosure 84 and passes from transport roll 94 to transport roll 116 through conventional drying oven 96 where heat transfer to web 14 and solidification of its coating may be accomplished by, for example, one or more of convection, conduction or radiation. If desired, multiple temperature zones and controls may be employed in oven 96 to enable timely temperature adjustment of web 14 and its coating. Web 14 next passes through a transition zone in the form of an eighth close-coupled enclosure 98. Close-coupled enclosure 98 has an underlying control surface 100 and overlying control surface 102 which lie in close proximity to the major surfaces of web 14 in a flat gap arrangement. Web 14 exits close-coupled enclosure 98 and passes over transport roll 116.

Some coated substrates require drying, curing or a combination of both drying and curing. Curing may be performed using a variety of mechanisms and curing stations that will be familiar to those skilled in the art (e.g., by using UV radiation to cure a 100% solids or solvent-borne (e.g., waterborne) coating composition). Curing may be accomplished in a ninth close-coupled enclosure 120 whose underlying control surface 122 and overlying control surface 124 lie in close proximity to the major surfaces of web 14. UV lamps 126 are integrated into overlying control surface 124. If required, close-coupled enclosure 120 may be supplied with an inert gas stream 128 through inlet 130. If required, temperature control during curing can accomplished through appropriate selection or control of the heat transfer properties of components in close-coupled enclosure 120 such as underlying control surface 122. Curing could also be carried out prior to drying in oven 96 or at other locations within the disclosed web handling process, or, depending on the nature of the coating composition, dispensed with entirely. Drying could likewise, depending on the nature of the coating composition, be dispensed with entirely.

Web 14 next passes over transport rolls 132, 144 through a tenth close-coupled enclosure 134 whose underlying control surface 136 and overlying control surface 138 lie in close proximity to the major surfaces of web 14. A light source 140 and camera or measuring instrument 142 (or other measuring or inspection devices that will be familiar to those skilled in the art) are respectively integrated into underlying control surface 136 and overlying control surface 138.

Web 14 may be passed over transport rolls 144, 152 through an eleventh close-coupled enclosure 146 whose underlying control surface 148 and overlying control surface 150 lie in close proximity to the major surfaces of web 14. Close-coupled enclosure 146 may serve as an equilibration zone to adjust web 14 and its solidified coating to one or more desired conditions (e.g., temperature, humidity or web tension) prior to roll formation at takeup reel 154.

The disclosed process and apparatus do not need to employ all the close-coupled enclosures shown in FIG. 1, and may employ different close-coupled enclosures or processes than those shown or more close-coupled enclosures or processes than those shown. Two or more of the disclosed close-coupled enclosures may be interconnected in series in a web process thereby creating multiple successive zones or applications. Each individual close-coupled enclosure may be operated at different pressures, temperatures and headspace or footspace gaps to address process and material variants. Individual close-coupled enclosures may have none, one or more than one conditioned gas inputs or gas withdrawal devices. A positive pressure could be maintained or established in some close-coupled enclosures and a negative pressure in other close-coupled enclosures. Use of interconnected close-coupled enclosures is recommended from at least the point of coating application (e.g., from the trailing edge of the coating bead when a coating die is employed) up to at least a station at which appreciable drying or appreciable curing occurs. Such interconnection can provide continuous protection that may discourage contamination of the unsolidified coating and facilitate control of the particle count in the atmosphere immediately surrounding the coated substrate while using only small volumes of conditioned gases. Additional control of coating conditions can be achieved by employing a close-coupled enclosure from at least the point of coating application through at least a station at which appreciable drying or appreciable curing occurs. Further control of coating conditions can be achieved by employing a close-coupled enclosure from at least the point of coating application up to at least the last drying or curing station in the process. Additional control can also be achieved by employing a close-coupled enclosure from a pre-coating station (e.g., a cleaning or priming station) up to the point of coating application. In one exemplary embodiment the coated substrate is not exposed to ambient air from at least the time the coating is applied until after the coating has solidified. The disclosed apparatus may also include one or more sections that do not represent a close-coupled enclosure, but desirably the number, total volume and gas flow patterns of such sections is such that undesirable contamination of the substrate does not arise.

If desired, conditioned gas streams could be injected (or gas could be withdrawn) at more or fewer locations along webline 1 than are shown in FIG. 1. In one exemplary embodiment, a conditioned gas stream could be injected at the first of several interconnected close-coupled enclosures, and the conditioned gas could be carried along with the moving substrate to the downstream close-coupled enclosures or pushed to an upstream enclosure or process. In another exemplary embodiment, conditioned gas streams could be injected wherever needed to maintain or establish a slight positive pressure in each of several interconnected close-coupled enclosures. In yet another exemplary embodiment, conditioned gas streams could be injected where needed to maintain or establish a slight positive pressure in some of several interconnected close-coupled enclosures, and a slight negative or zero pressure could be maintained or established in other interconnected close-coupled enclosures. In yet another exemplary embodiment, conditioned gas streams could be injected at each of several interconnected close-coupled enclosures.

A cleanroom could optionally surround webline 1. However, this could be of a much lower classification and much smaller volume than that which might typically be used today. For example, the cleanroom could be a portable model using flexible hanging panel materials. A similar cleanroom could be used in addition to or in place of cabinets 12 and 156 in FIG. 1.

Those skilled in the art will appreciate that the disclosed apparatus could readily be adapted to coat both major surfaces of a moving substrate. Those skilled in the art will also appreciate that a variety of coating devices may be used, including roll coaters, slide coaters, bath coaters, spray coaters, fluid bearing coaters and the like. Also, a variety of web support systems that will be familiar to those skilled in the art may be employed in the disclosed process and apparatus, including porous air tubes, air bars, and air foils.

In addition to or in place of the cleaning and priming operations shown in FIG. 1, a variety of other dry converting operations may be employed in the disclosed apparatus and process, such as the dry converting operations described in U.S. patent application Ser. No. 10/810,065, filed Mar. 26, 2004 and entitled "DRY CONVERTING PROCESS AND APPARATUS", the disclosure of which is incorporated herein by reference.

In one embodiment of the disclosed process, a moving substrate of indefinite length has at least one major surface with an adjacent gas phase. The substrate is treated with an apparatus having a control surface in close proximity to a surface of the substrate to define a control gap between the substrate and the control surface. The control gap may be referred to as the "headspace" for a control gap between a coated (or to be coated) side of a substrate and a control surface, and as the "footspace" for a control gap between an uncoated side of a substrate and a control surface.

A first chamber may be positioned near a control surface, with the first chamber having a gas introduction device. A second chamber may be positioned near a control surface, the second chamber having a gas withdrawal device. The control surface and the chambers together define a region wherein the adjacent gas phases possess an amount of mass. At least a portion of the mass from the adjacent gas phases is transported through the gas withdrawal device by inducing a flow through the region. The mass flow can be segmented into the following components:

M1 means total net time-average mass flow per unit of substrate width into or out of the region resulting from pressure gradients, M1' means the total net time-average mass flow of a gas per unit width into the region through the first chamber from the gas introduction device, M2 means the time-average mass flow of conditioned gas per unit width from or into the at least one major surface of the substrate or coating into or from the region, M3 means total net time-average mass flow per unit width into the region resulting from motion of the material, and M4 means time-average rate of mass transport through the gas withdrawal device per unit width, where "time-average mass flow" is represented by the equation $$MI = \frac{1}{t} \int_0^t mi\, dt,$$

wherein M1 is the time-average mass flow in kg/second, t is time in seconds, and mi is the instantaneous mass flow in kg/second.

The mass flow in the gas phase is represented by the equation:

$$M1 + M1' + M2 + M3 = M4 \qquad \text{(Equation A)}.$$

Figure 3:
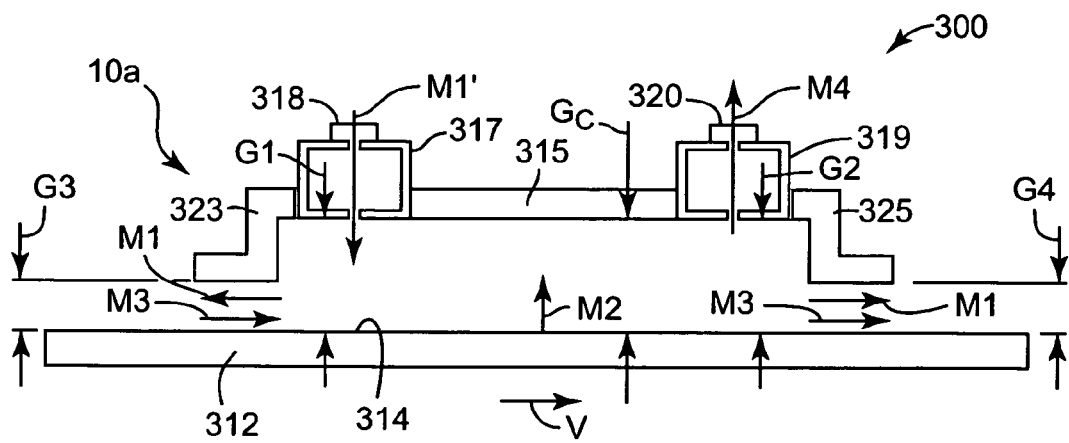
FIG. 3 is a schematic side sectional view of a disclosed close-coupled enclosure.

M1, M1', M2, M3 and M4 are further illustrated in FIG. 3. FIG. 3 is a schematic side sectional view of a close-coupled enclosure 300. A substrate 312 has at least one major surface 314 with an adjacent gas phase (not shown in FIG. 3). The substrate 312 is in motion in the direction of arrow "V" under a control surface 315, thus defining a control gap "$G_C$". A first chamber 317 having a gas introduction device 318 is positioned near the control surface 315. The exact form of the gas introduction device 318 may vary, and expedients such as a gas knife, a gas curtain, or a gas manifold can be used. While the illustrated embodiment depicts first chamber 317 in the form of a plenum, it is not necessary that the gas introduction device 318 be positioned at a remove from the level of control surface 315. A second chamber 319 is also positioned near the control surface 315, and has a gas withdrawal device 320. Once again, while the illustrated embodiment depicts the second chamber 319 in the form of a plenum, it is not necessary that the gas withdrawal device 320 be positioned at the level of control surface 315. In an exemplary embodiment, the first chamber 317 and the second chamber 319 will be at opposing ends of the control surface 315 as depicted in FIG. 3. The first chamber 317 defines a first gap G1 between the first chamber 317 and the substrate 312. The second chamber 319 defines a second gap G2 between the second chamber 319 and the substrate 312. In some embodiments, the first gap G1, the second gap G2, and the control gap GC are all of equal height, however in other embodiments, at least one of the first gap G1 or the second gap G2 has a height different than the control gap GC. Best results appear to be achieved when the first gap, second gap and control gap are all 10 cm or less. In some exemplary embodiments the first gap, the second gap, and the control gap are all 5 cm or less, 3 cm or less, or even smaller values, e.g., 2 cm or less, 1.5 cm or less, or 0.75 cm or less. The airflow required to attain a desired low particle count may vary in part with the square of the combined headspace and footspace, and accordingly the disclosed gaps desirably have relatively small values. Similarly, best results appear to be achieved when the total of the average headspace and average footspace is 10 cm or less, 5 cm or less, 3 cm or less, or even smaller values, e.g., 2 cm or less, 1.5 cm or less, or 0.75 cm or less.

In addition to gaps $G_C$, G1 and G2, the dilution of the vapor component may also be minimized by using mechanical features, such as extensions 323 and 325 in FIG. 3. The extensions 323 and 325, having gaps G3 and G4, may be added to one of both of the upstream or downstream ends of the apparatus. Those skilled in the art will recognize that the extensions may be affixed to various members of the apparatus or provided with alternate shapes depending on the specific embodiment selected for a particular purpose. Dilution will generally be reduced as the substrate area "covered" by the extensions increases. The adjacent gas phase between the control surface 315, first chamber 317, second chamber 319 and the surface 314 of the substrate 312 define a region possessing an amount of mass. The extensions 323 and 325 may further define the region under the control surface having an adjacent gas phase possessing an amount of mass. The mass in the region is generally in a gas phase. However, those skilled in the art will recognize that the region may also contain mass that is in either the liquid or solid phase, or combinations of all three phases.

FIG. 3 depicts the various flow streams encountered in close-coupled enclosure 300 when practicing the disclosed process. M1 is the total net time-average mass flow per unit width into or out of the region resulting from pressure gradients. M1 is a signed number, negative when it represents a small outflow from the region as the drawing depicts, and positive when it represents a small inflow into the region, opposing the depicted arrows. Positive values of M1 essentially represent a dilution stream and possible source of contaminants that desirably are reduced and more desirably are made negative for the overall portion of the apparatus constituting interconnected close-coupled enclosures. M1' is the total net time-average mass flow of conditioned gas per unit width into the region from gas introduction device 318. If brought to a sufficient level, M1' reduces the particle count in the close-coupled enclosure. M1' can provide a sufficient improvement in the cleanliness of major surface 314 that the dilution M1' engenders can be tolerated. Excessively high M1' flows desirably are avoided in order to limit disturbance of coating 314. M2 is the time-average mass flow per unit width from or into at least one major surface of the substrate or coating into the region and through the chamber. M2 essentially represents evolution of solvent or other material into close-coupled enclosure 300. M3 is the total net time-average mass flow per unit width into the region and through the chamber resulting from motion of the substrate. M3 essentially represents gas swept along with the substrate in its motion. M4 is the time-average rate of mass transported per unit width through the gas withdrawal device 320. M4 represents the sum of M1+M1'+M2+M3.

Mass flow through a close-coupled enclosure may be assisted by employing a suitable seal with respect to the moving substrate (viz., a "moving substrate seal") at an upstream or downstream inlet or outlet of a close-coupled enclosure or connected chain of close-coupled enclosures. The seal may function as a sweep to prevent gas from entering or exiting the close-coupled enclosures. A coating head can provide a built-in liquid seal where the coating bead contacts the substrate. The seal could also include for example a forced gas, mechanical or retractable mechanical seal such as those shown in U.S. Pat. No. 6,553,689, or a pair of opposed nip rolls. A retractable mechanical sealing mechanism can allow passage of overly thick coatings, splices and other upset conditions. It may be desirable briefly to increase one or more nearby conditioned gas flow rates (or to decrease or switch one or more nearby gas withdrawal rates) to maintain the desired atmosphere near the seal. A pair of opposed nip rolls may be located for example, upstream from the coating device or downstream from the point at which the coating has sufficiently solidified to withstand (or benefit from) nip roll compression.

By using a control surface in close proximity to the substrate surface, a supply of conditioned gas and a positive or small negative pressure gradient, a material particle count reduction may be obtained within a close-coupled enclosure. The pressure gradient, $\Delta p$, is defined as the difference between the pressure at the chamber's lower periphery, pc, and the pressure outside the chamber, po, wherein $\Delta p = pc - po$. Through appropriate use of conditioned gas and adjustment of the pressure gradient, particle count reductions of, for example, 50% or more, 75% or more, 90% or more or even 99% or more may be achieved. An exemplary pressure gradient is at least about −0.5 Pa or higher (viz., a more positive value). Another exemplary pressure gradient is a positive pressure gradient. As a general guide, greater pressures can be tolerated at higher moving substrate speeds. Greater pressures can also be tolerated when moving substrate seals are employed at the upstream and downstream ends of a series of interconnected close-coupled enclosure. Those skilled in the art will appreciate that the close-coupled enclosure pressure(s) may be adjusted based on these and other factors to provide a desirably low particle count within appropriate portions of the disclosed apparatus while avoiding undue disturbance in the unsolidified coating.

The disclosed process and apparatus may also substantially reduce the dilution gas flow, M1, transported through the chamber. The disclosed process and apparatus may, for example, limit M1 to an absolute value not greater than 0.25 kg/second/meter. M1 may be, for example, less than zero (in other words, representative of net outflow from the close-coupled enclosure) and greater than −0.25 kg/second/meter. In another exemplary embodiment, M1 may be less than zero and greater than −0.1 kg/second/meter. As is shown in the examples below, small negative enclosure pressures (which may correspond to slight positive M1 flows) can be tolerated. However, large negative enclosure pressures (which may correspond to large positive M1 flows) may cause adverse effects including dilution of mass in the adjacent gas phase, introduction of particles and other airborne contaminants, and introduction of uncontrolled ingredients, temperatures or humidity.

In one exemplary embodiment we control a process by appropriately controlling M1' and M4. A deliberate influx of a conditioned gas stream (e.g., a clean, inert gas having a controlled humidity) can materially promote a clean, controlled atmosphere in the close-coupled enclosure without unduly increasing dilution. By carefully controlling the volume and conditions under which M1' is introduced and M4 is withdrawn (and for example by maintaining a slight positive pressure in the close-coupled enclosure), flow M1 can be significantly curtailed and the close-coupled enclosure particle count can be significantly reduced. Additionally, the M1' stream may contain reactive or other components or optionally at least some components recycled from M4.

The close proximity of control surfaces in the close-coupled enclosure to the substrate major surfaces, and the relatively small pressure gradient, enable the transport of the mass in the adjacent gas phase through the close-coupled enclosure with minimal dilution. Thus lower flow rates at higher concentrations may be transported and collected. The disclosed process is also suitable for transporting and collecting relatively small amounts of mass located in the adjacent gas phase.

The headspace or footspace may be substantially uniform from the upstream end to the downstream end and across the width of the close-coupled enclosure. The headspace or footspace may also be varied or non-uniform for specific applications. The close-coupled enclosure may have a width wider than the substrate and desirably will have closed sides that further reduce time-average mass flow per unit width from pressure gradients (M1). The close-coupled enclosure can also be designed to conform to different geometry material surfaces. For example, the close-coupled enclosure can have a radiused periphery to conform to the surface of a cylinder.

The close-coupled enclosure may also include one or more mechanisms to control the phase of the mass transported through the close-coupled enclosure thereby controlling phase change of the components in the mass. For example, conventional temperature control devices may be incorporated into the close-coupled enclosure to prevent condensate from forming on the internal portions of the close-coupled enclosure. This may help discourage blushing in the solidified coating. Non-limiting examples of suitable temperature control devices include heating coils, electrical heaters, external heat sources and heat transfer fluids.

Optionally, depending upon the composition of the gas phase composition, the withdrawn gas stream (M4) may be vented or filtered and vented after exiting the close-coupled enclosure. The disclosed process may be used for the continuous collection of a gas phase composition. The gas phase composition may flow from one or more of the close-coupled enclosures to a subsequent processing location, e.g., without dilution. The subsequent processing may include such optional steps as, for example, separation or destruction of one or more components in the gas phase. The collected vapor stream may also contain a liquid phase mixture or particulate matter which can be filtered prior to the separation process. Separation processing may also occur internally within the close-coupled enclosure in a controlled manner. Suitable separation processes will be familiar to those skilled in the art and include concentration of the vapor composition in the gaseous stream; direct condensation of the dilute vapor composition in the gaseous stream; direct condensation of the concentrated vapor composition in the gaseous stream; direct two stage condensation; adsorption of the dilute vapor composition in the gaseous stream using activated carbon or synthetic adsorption media; adsorption of the concentrated vapor composition in the gaseous stream using activated carbon or synthetic adsorption media; absorption of the dilute vapor phase component in the gaseous stream using media with high absorbing properties; and absorption of the concentrated vapor phase component in the gaseous stream using media with high absorbing properties. The high concentration and low volumetric flows of the vapor composition enhance the overall efficiency of conventional separation practices. For example, at least a portion of the vapor component may be captured at concentrations high enough to permit subsequent separation of the vapor component at a temperature of 0° C. or higher. This temperature prevents the formation of frost during the separation process, and may provide both equipment and process advantages. Suitable destruction processes will also be familiar to those skilled in the art and include conventional devices such as thermal oxidizers.

Depending on the specific gas phase composition, the close-coupled enclosure may optionally include flame-arresting capabilities. A flame arresting device placed internally within the close-coupled enclosure allows gases to pass through but extinguishes flames in order to prevent a large scale fire or explosion. A flame is a volume of gas in which a self-sustaining exothermic (energy producing) chemical reaction occurs. Flame arresting devices are generally needed when the operating environment includes oxygen, high temperatures and a flammable gas mixed with the oxygen in suitable proportions to create a combustible mixture. A flame-arresting device works by removing one of the noted elements. In one exemplary embodiment, the gas phase components pass through a narrow gap bordered by heat absorbing materials. The size of both the gap and the material are dependent upon the specific vapor composition. For example, the chamber may be filled with expanded metallic heat-absorbing material, such as, for example, aluminum, contained at the bottom by a fine mesh metallic screen with mesh openings sized according to the National Fire Protection Association Standards. Optional separation devices and conveying equipment that may be utilized in the disclosed process and apparatus may also possess flame arresting capabilities. Those skilled in the art will be familiar with suitable flame arresting devices and techniques for use with such devices and equipment.

Representative articles that can be made using the disclosed process and apparatus include, for example, coatings containing polymers, pigments, ceramics or pastes. The substrate may be, for example, a polymer, woven or nonwoven material, fibers, powder, paper, a food product, pharmaceutical product or combinations thereof. The coating may include at least one evaporative component or may be a 100% solids coating composition. If present, the evaporative component may be any liquid or solid composition that is capable of vaporizing and separating from the coated substrate. Non-limiting examples would include organic compounds and inorganic compounds or combinations thereof, such as water or ethanol. Sufficient energy is supplied to the article to vaporize at least one evaporative component or to cure the coating, or both. The supplied energy may involve radiation, conduction, convection or combinations thereof. Conductive heating, for example could include passing the substrate or coating in close proximity to a flat heated plate, curved heated plate or partially wrapping the substrate around a heated cylinder. Examples of convective heating may include directing hot air by nozzle, jet or plenum at the article. Electromagnetic radiation such as radio frequency, microwave, or infrared, may be directed at the substrate or coating and absorbed causing internal heating. Energy may be supplied to any or all surfaces of the substrate or coating. Additionally, the substrate or coating may be supplied with sufficient internal energy, for example a pre-heated substrate or an exothermic chemical reaction occurring in the substrate or coating. The various energy sources may be used individually or in combination. Those skilled in the art will recognize that the recited energy may be supplied from a variety of sources, including electricity, the combustion of fuels, and other thermal sources. The energy may be supplied directly to the application point, or indirectly through heated liquids such as water or oil, heated gases such as air or inert gas or heated vapors such as steam or conventional heat transfer fluids.

The total mass flow (M4) through the close-coupled enclosure may be selected to match or exceed the generation rate of gas phase components from the substrate or coating (M2). This may assist in preventing either the dilution or loss of vapor components.

Figure 4:
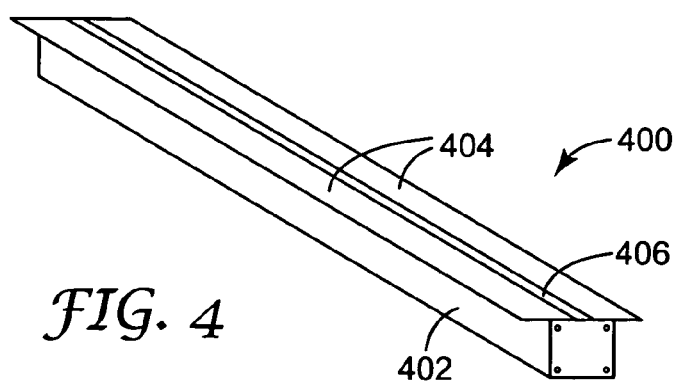
FIG. 4 is a perspective view of a disclosed distribution manifold.
Figure 5:
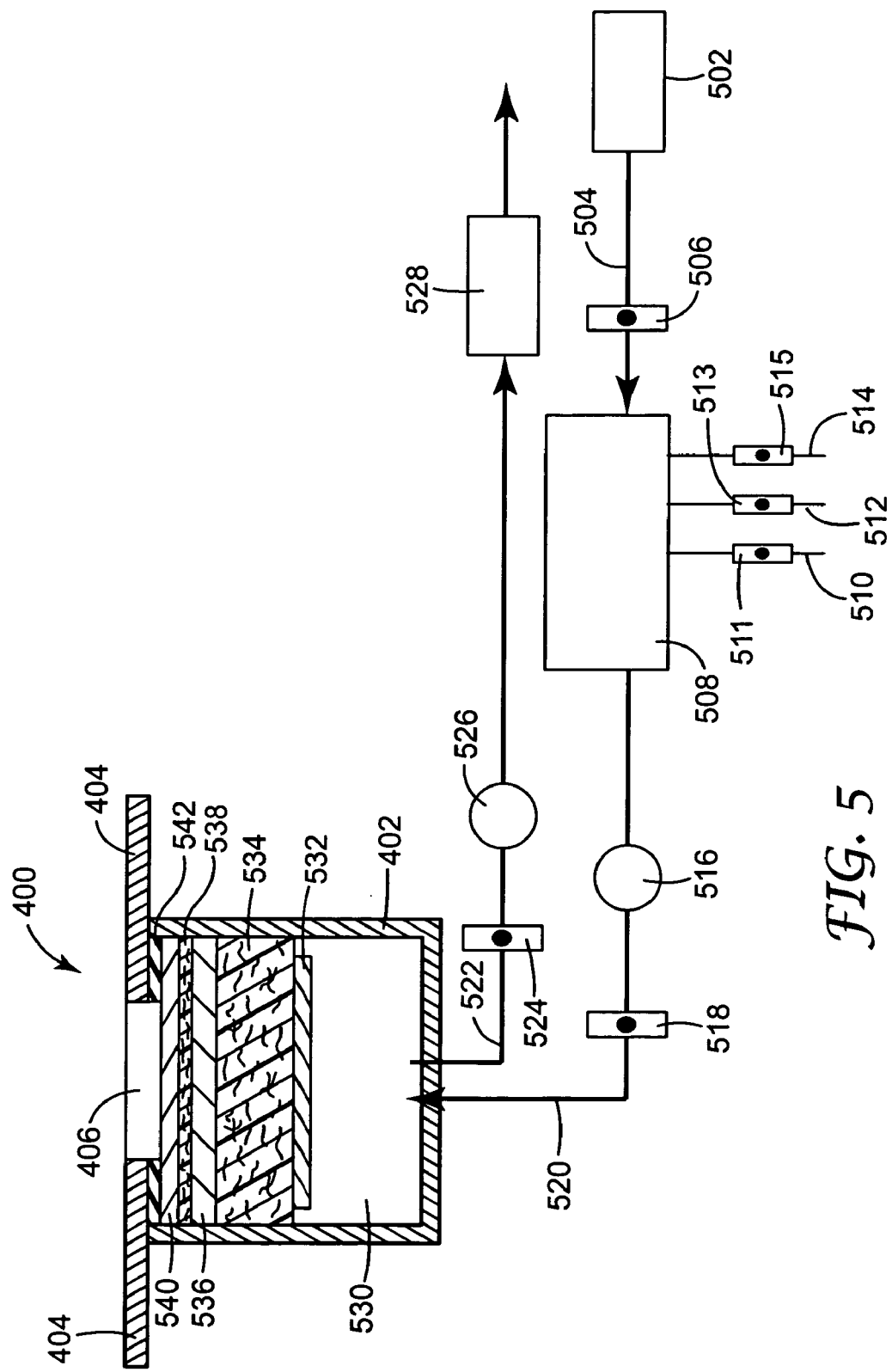
FIG. 5 is a partial schematic, partial cross sectional view of the distribution manifold of FIG. 4 and associated conditioned gas supply and gas withdrawal components.

It is desirable to avoid airflow patterns that might disturb the unsolidified coating and cause "mottle" or other defects. FIG. 4 is a perspective view of a disclosed distribution manifold 400 that can assist in providing an even flow of supplied conditioned gas (M1'). Manifold 400 has a housing 402, and mounting flanges 404 flanking slit 406. Further details regarding manifold 400 are shown in FIG. 5, which is a schematic partial cross sectional view of manifold 400 and an associated gas conditioning system. Gas source 502 supplies a suitable gas (e.g., nitrogen or an inert gas) to gas conditioning system 508 via line 504 and valve 506. System 508 is optionally supplied with additional reactive species via lines 510, 512 and 514 and valves 511, 513 and 515. System 508 supplies the desired conditioned gas stream to manifold 400 via line 520, valve 516 and flow sensor 518. Vacuum line 522 may be used to withdraw gas from manifold 400 via flow sensor 524, valve 526 and vacuum pump 528. The presence of both a supply line and a vacuum line enables manifold 400 to be used as a conditioned gas introduction or gas withdrawal device. Gases entering manifold 400 pass through head space 520, around diverter plate 532, and through distribution media 534 (made, e.g., using white SCOTCHBRITE™ nonwoven fabric, commercially available from 3M Co.), and then pass through a first perforated plate 536, HEPA filter media 538 and a second perforated plate 540 before entering slit 406. Gasket 542 helps maintain a seal between flanges 404 and perforated plate 540. Manifold 400 can help supply a substantially uniform flow of supplied conditioned gas across the width of a close-coupled enclosure. The pressure drop laterally in the head space 520 is negligible in comparison to the pressure drop through the remaining components of manifold 400. Those skilled in the art will appreciate that the dimensions or shape of head space 520 and the pore size of distribution media 534 may be adjusted as needed to vary the flow rate across the length of distribution manifold 400 and along the width of a close-coupled enclosure. The flow rate along the length of distribution manifold 400 can also be adjusted by using an array of bolts or other suitable devices arranged to bear against diverter plate 532 and compress distribution media 534, thereby adjustably varying the pressure drop along the length of distribution manifold 400.

Figure 6:
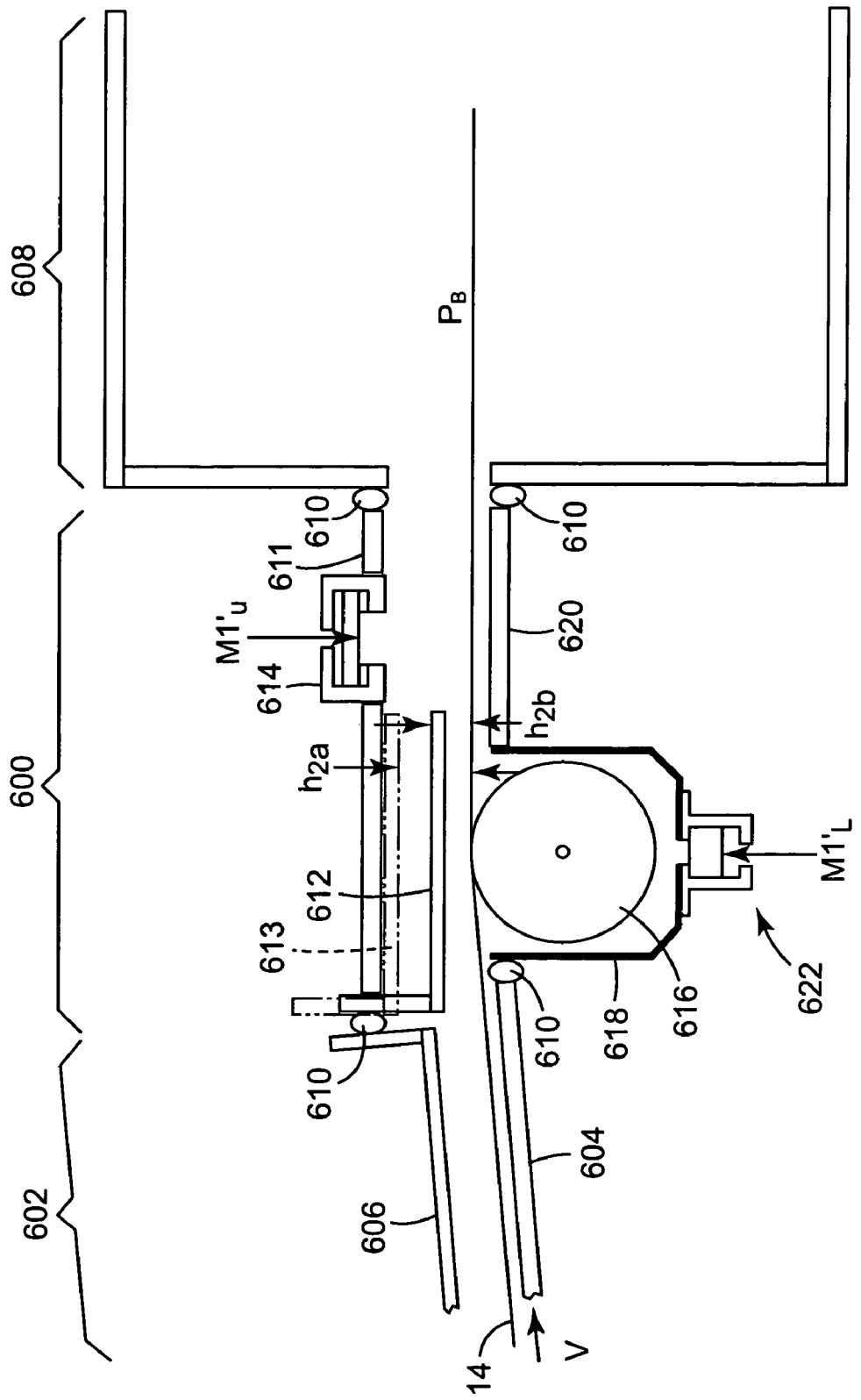
FIG. 6 is a schematic cross sectional view of a transport roll and distribution manifold.

FIG. 6 shows a close-coupled enclosure in the form of a transition zone 600 coupled at its upstream end to a gap dryer 602 having underlying control surface 604 and overlying control surface 606. The downstream end of transition zone 600 is coupled to process 608 operating at a pressure pB. Gaskets 610 provide a seal at each end of transition zone 600 and permit removal of the overlying or underlying control surfaces for, e.g., cleaning or web threadup. Transition zone 600 has a fixed overlying control surface 611 and a positionable overlying control surface 612 (shown in phantom in its raised position 613) that may be manually or automatically actuated to provide headspace values of h2a, h2b and values in between. Upper distribution manifold 614 may be used to supply conditioned gas stream $M1'_U$. The underlying side of transition zone 600 has transport roll 616 inside housing 618, and underlying control surface 620. Lower distribution manifold 622 may be used to supply conditioned gas stream $M1'_L$. Transition zone 600 may be helpful in avoiding mottle or other defects by discouraging large gas flows between adjacent connected processes involving a material difference in respective operating pressures. For example, there may a two-fold or greater, five-fold or greater or even ten-fold or greater pressure difference between a disclosed close-coupled enclosure at an upstream or downstream end of a transition zone and a conventional oven at the other end of the transition zone.

Figure 7:
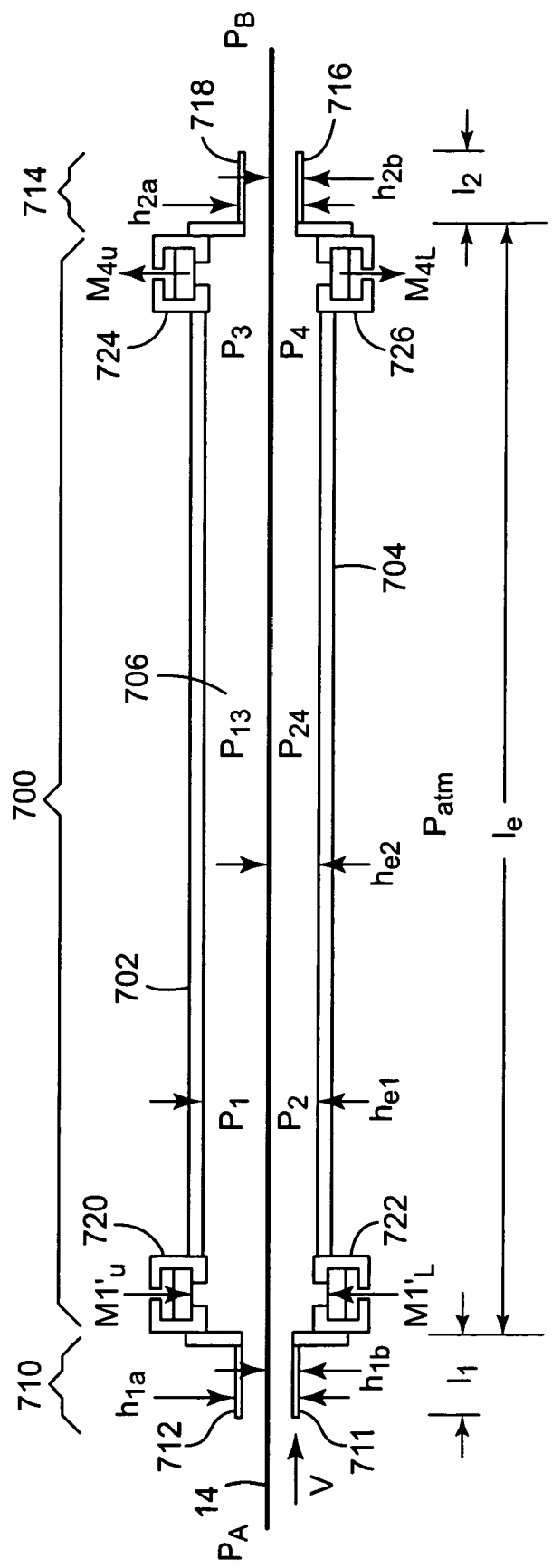
FIG. 7 is a schematic side sectional view of another disclosed close-coupled enclosure.
Figure 8:
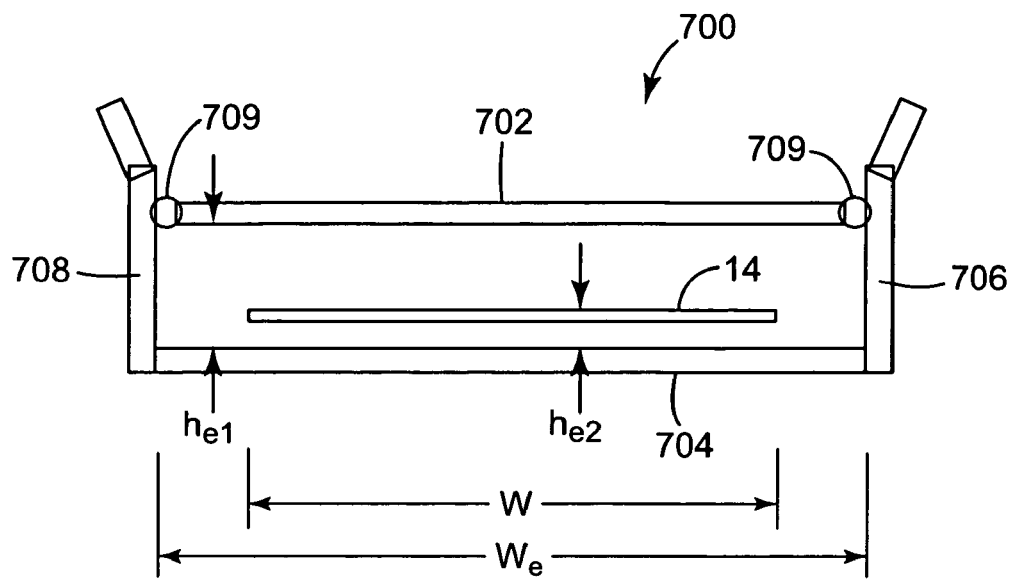
FIG. 8 is a schematic cross sectional view of the close-coupled enclosure of FIG. 7.

FIG. 7 and FIG. 8 respectively show a schematic sectional view and a cross sectional view of a close-coupled enclosure 700 having overlying control surface 702, underlying control surface 704 and sides 706 and 708. Close-coupled enclosure 700 has length $l_e$ and width $w_e$. Web 14 has width w, and is transported through close-coupled enclosure 700 at velocity V. Gaskets 709 provide a seal at the sides of overlying control surface 702 and permit its height adjustment or removal (e.g., for cleaning or web threadup). Overlying control surface 702 and underlying control surface 704 are spaced apart a distance $h_{e1}$. Underlying control surface 704 is spaced apart from substrate 14 a distance $h_{e2}$. These distances may vary in the upstream or downstream directions. Upstream transition zone 710 has underlying and overlying web slot pieces 711 and 712. These web slot pieces are spaced apart a distance $h_{1a}$, and have length $l_1$. Underlying web slot piece 711 is spaced apart from web 14 a distance $h_{1b}$. An upstream process (not shown in FIG. 7 or FIG. 8) is in direct gaseous communication with transition zone 710 and has pressure $P_A$. Downstream transition zone 714 has underlying and overlying web slot pieces 716 and 718. These web slot pieces are spaced apart a distance $h_{2a}$, and have length $l_2$. Underlying web slot piece 716 is spaced apart from web 14 a distance $h_{2b}$. A downstream process (not shown in FIG. 7 or FIG. 8) is in direct gaseous communication with transition zone 714 and has pressure $P_B$. When an upstream or downstream process is required to operate at a large pressure differential from an enclosure such as close-coupled enclosure 700, the transition zones between the upstream or downstream process and the close-coupled enclosure may utilize additional dilution (or exhaust) streams to decrease the pressure differential between the process and the close-coupled enclosure. For example, convection ovens often operate at large negative pressures (−25 Pa is not uncommon), inducing large gas flows.

Upper and lower manifolds 720 and 722 respectively may provide gas flows into or out of the upstream end of close-coupled enclosure 700 (e.g., conditioned gas streams $M1'_U$ and $M1'_L$). Upper and lower manifolds 724 and 726 respectively may provide gas flows into or out of the upstream end of close-coupled enclosure 700 (e.g., withdrawn gas streams $M4_U$ and $M4_L$). The pressures inside the enclosure can be characterized by $P_1$, $P_2$, $P_{13}$, $P_{23}$, $P_3$ and $P_4$. The ambient air pressure outside close-coupled enclosure 700 is given by $P_{atm}$.

The disclosed process and apparatus typically will utilize a web handling system to transport a moving substrate of indefinite length through the apparatus. Those skilled in the art will be familiar with suitable material handling systems and devices.

In operation, exemplary embodiments of the disclosed apparatus can significantly reduce the particle count in the atmosphere surrounding a moving coated web. Exemplary embodiments of the disclosed apparatus may also capture at least a portion of a vapor component from an unsolidified or solidified coating (if present) without substantial dilution and without condensation of the vapor component in a drying system. The supplied conditioned gas may significantly reduce the introduction of particulates into portions of the apparatus surrounding the coating and thus may reduce or prevent product quality problems in the finished product. The relatively low air flow may significantly reduce disturbances to the coating and thus may further reduce or prevent product quality problems. The collection of a vapor component at high concentrations may permit efficient recovery of the vapor component. The absence of or reduction in condensation in a drying system may further reduce or prevent product quality issues caused by condensate falling onto the coating.

EXAMPLE 1

Figure 9:
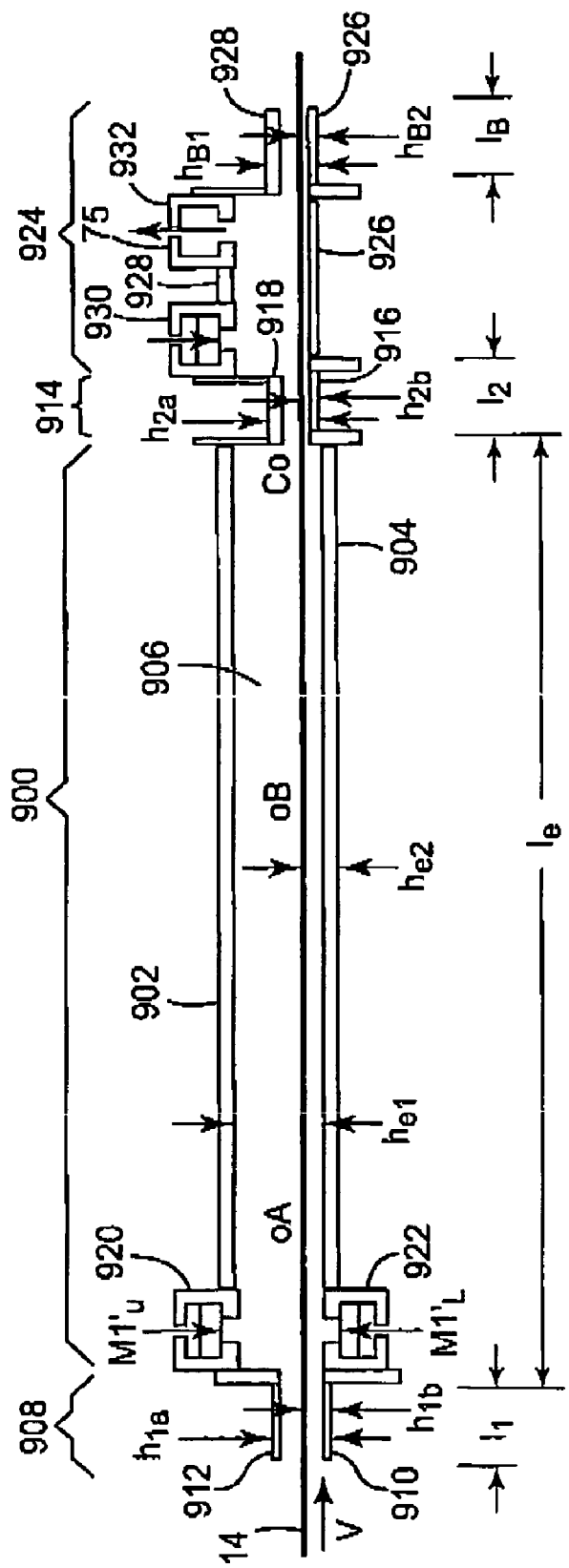
FIG. 9 is a schematic side sectional view of another disclosed close-coupled enclosure.

A single close-coupled enclosure was constructed to illustrate the effect of certain variables. FIG. 9 shows a schematic side sectional view of a close-coupled enclosure 900. Close-coupled enclosure 900 has overlying control surface 902, underlying control surface 904 and side 906 equipped with sample ports A, B and C for measuring pressure, particle count and oxygen levels within close-coupled enclosure 900. Overlying control surface 902 and underlying control surface 904 are spaced apart a distance $h_{e1}$. Underlying control surface 904 is spaced apart from substrate 14 a distance $h_{e2}$. Upstream transition zone 908 has underlying and overlying web slot pieces 910 and 912. These web slot pieces are spaced apart a distance $h_{1a}$, and have length $l_1$. Underlying web slot piece 910 is spaced apart from web 14 a distance $h_{1b}$. Downstream transition zone 914 has underlying and overlying web slot pieces 916 and 918. These web slot pieces are spaced apart a distance $h_{2a}$, and have length $l_2$. Underlying web slot piece 916 is spaced apart from web 14 a distance $h_{2b}$. Upper and lower distribution manifolds 920 and 922 respectively supply conditioned gas streams $M1'_U$ and $M1'_L$ at the upstream end of close-coupled enclosure 900. Web 14 is transported through close-coupled enclosure 900 at velocity V.

Downstream process 924 has movable underlying control surface 926, overlying control surface 928 equipped with ambient gas inlet 930 and vacuum outlet 932, and underlying and overlying web slot pieces 926 and 928. These web slot pieces are spaced apart a distance $h_{B1}$. Underlying web slot piece 926 is spaced apart from web 14 a distance $h_{B2}$. These web slot pieces have length $l_3$. Through appropriate regulation of the flows through inlet 930 and outlet 932, process 924 can simulate a variety of devices, e.g., a conventional oven.

For purposes of this example close-coupled enclosure 900 was used with an uncoated web and was not connected at either its upstream or downstream ends to another close-coupled enclosure. Thus the surrounding room, with a defined ambient pressure of zero, lies upstream from transition zone 908 and downstream from process 924. The room air temperature was about 20° C.

Figure 10:
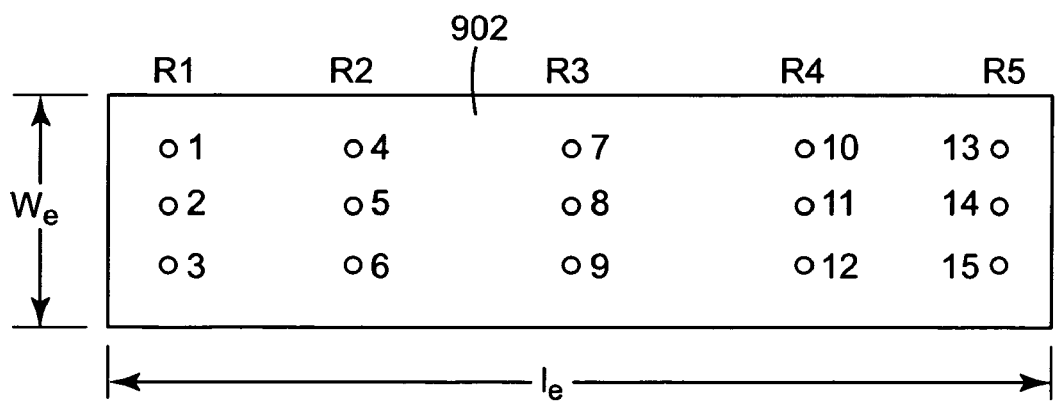
FIG. 10 is a schematic plan view of the overlying control surface in FIG. 9.

FIG. 10 shows a plan view of overlying control surface 902. Surface 902 has length $l_e$ and width $w_e$, and contains 5 rows of 3 numbered holes each having a 9.78 mm diameter and a 0.75 cm² area, with the lowest numbered holes located at the upstream end of control surface 902. The holes can be used as sample ports for measuring pressure, particle count and oxygen levels at different locations within the enclosure and may also be left open or taped closed to vary the open draft area of close-coupled enclosure 900.

Particle counts were measured using a MET ONE™ Model 200L-1-115-1 Laser Particle Counter (commercially available from Met One Instruments, Inc.), to determine the number of 0.5 μm or larger particles in a volume of 28.3 liters, at a 28.3 liters/min flow rate. Pressures were measured using a Model MP40D micromanometer (commercially available from Air-Neotronics Ltd.). Oxygen levels were measured using a IST-AIM™ Model 4601 Gas Detector (commercially available from Imaging and Sensing Technology Corporation). Gas velocities were evaluated using a Series 490 Mini Anemometer (commercially available from Kurz Instruments, Inc.).

Upper and lower distribution manifolds 920 and 922 were connected to a nitrogen supply and the flow rates adjusted using DWYER™ Model RMB-56-SSV flow meters (commercially available from Dwyer Instruments, Inc.). Vacuum outlet 932 was connected to a NORTEC™ Model 7 compressed air driven vacuum pump (commercially available from Nortec Industries, Inc.). The flow rate was adjusted using a pressure regulator and a DWYER Model RMB-106 flow meter (commercially available from Dwyer Instruments, Inc.).

Figure 11:
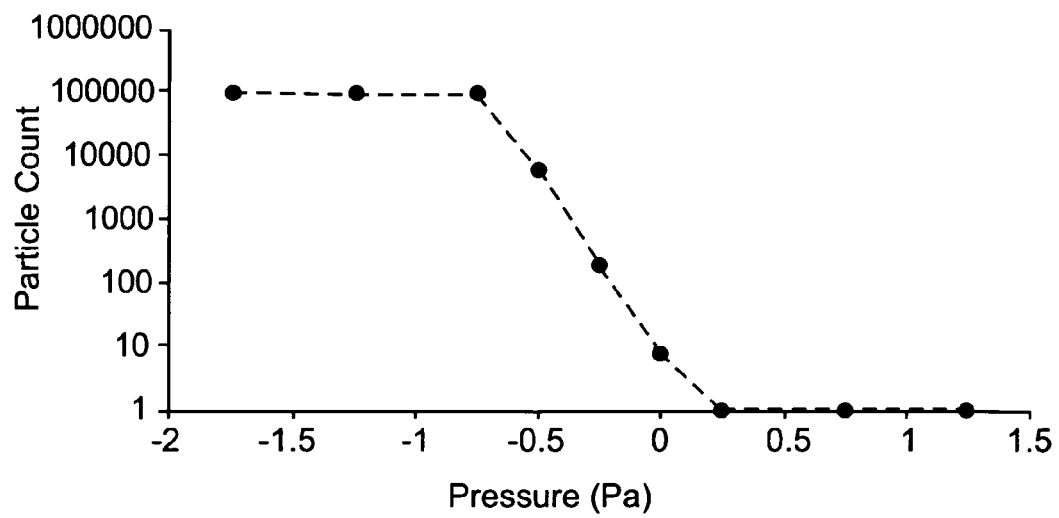
FIG. 11 is a graph showing particle count versus pressure in a disclosed close-coupled enclosure.
Figure 12:
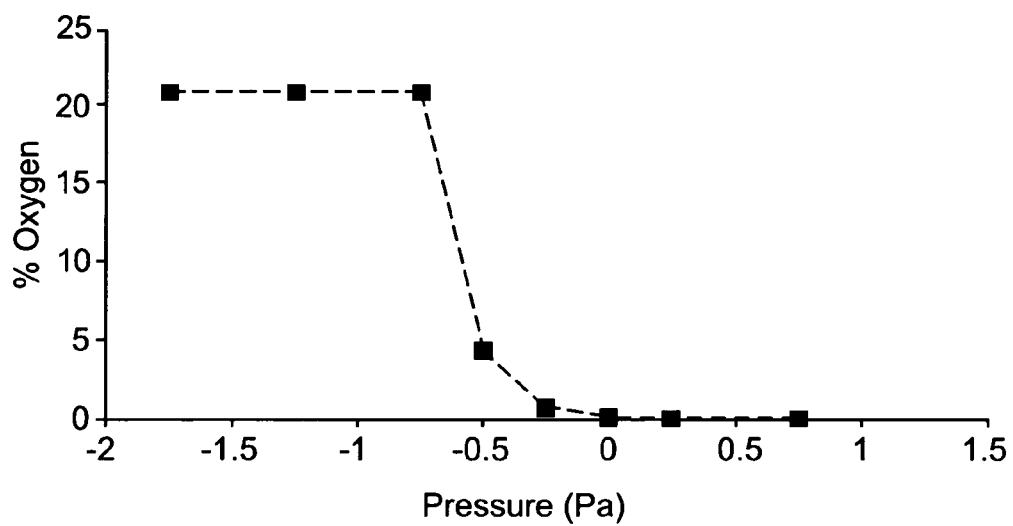
FIG. 12 is a graph showing oxygen level versus pressure in a disclosed close-coupled enclosure.

Close-coupled enclosure 900 was adjusted so that $l_e$=156.2 cm, $w_e$=38.1 cm, $h_{e1}$=4.45 cm, $h_{e2}$=0.95 cm, $h_{1a}$=0.46 cm, $h_{1b}$=0.23 cm, $l_1$=7.62 cm, $h_{2a}$=1.27 cm, $h_{2b}$=0.13 cm, $l_2$=3.8 cm, $h_{B1}$=0.46 cm, $h_{B2}$=0.23 cm, $l_3$=2.54 cm and V=0. The enclosure pressure was adjusted by varying the flow rates $M1'_U$ and $M1'_L$ and the rate of gas withdrawal at outlet 932, using sample port B (see FIG. 9) to monitor pressure. Hole 11 (see FIG. 10) was used to monitor particle count and sample port C (see FIG. 9) was used to monitor the oxygen level. Inlet 930, the remaining holes in control surface 902 and sample port A were taped closed, thereby providing a minimal open draft area in close-coupled enclosure 900. The results are shown in FIG. 11 (which uses a logarithmic particle count scale) and FIG. 12 (which uses a linear oxygen concentration scale), and demonstrate that for a stationary web, material particle count reductions were obtained, at, e.g., pressures greater than or equal to about −0.5 Pa. At positive enclosure pressures, the particle counts were at or below the instrument detection threshold. The curves for particle count and oxygen level were very similar to one another.

EXAMPLE 2

Figure 13:
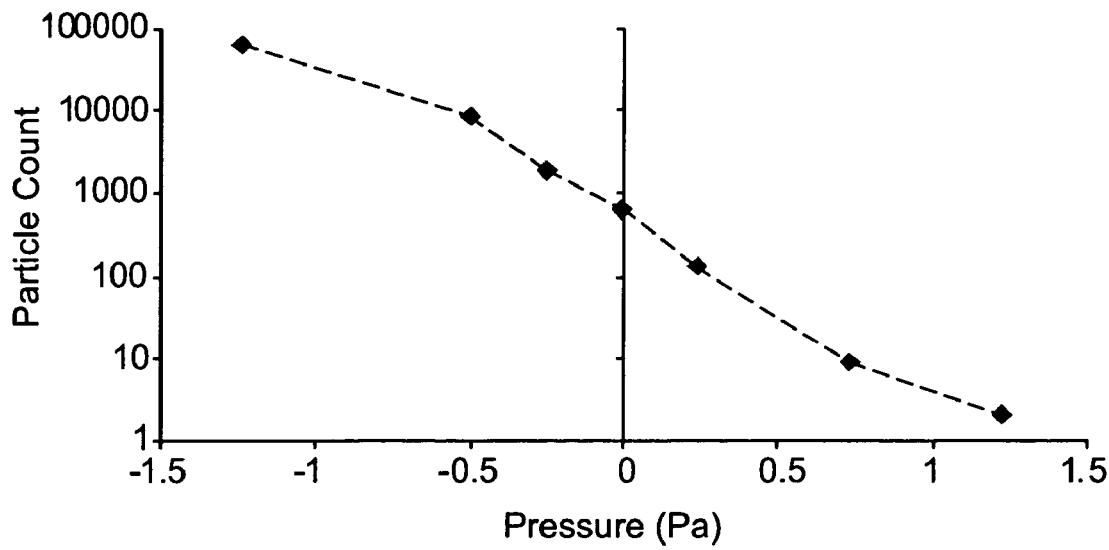
FIG. 13 is a graph showing particle count versus pressure in a disclosed close-coupled enclosure.

Example 1 was repeated using an 18 m/minute web velocity V. The particle count results are shown in FIG. 13 (which uses a logarithmic particle count scale). FIG. 13 demonstrates that for a moving web, material particle count reductions were obtained, at, e.g., pressures greater than −0.5 Pa.

EXAMPLE 3

Figure 14:
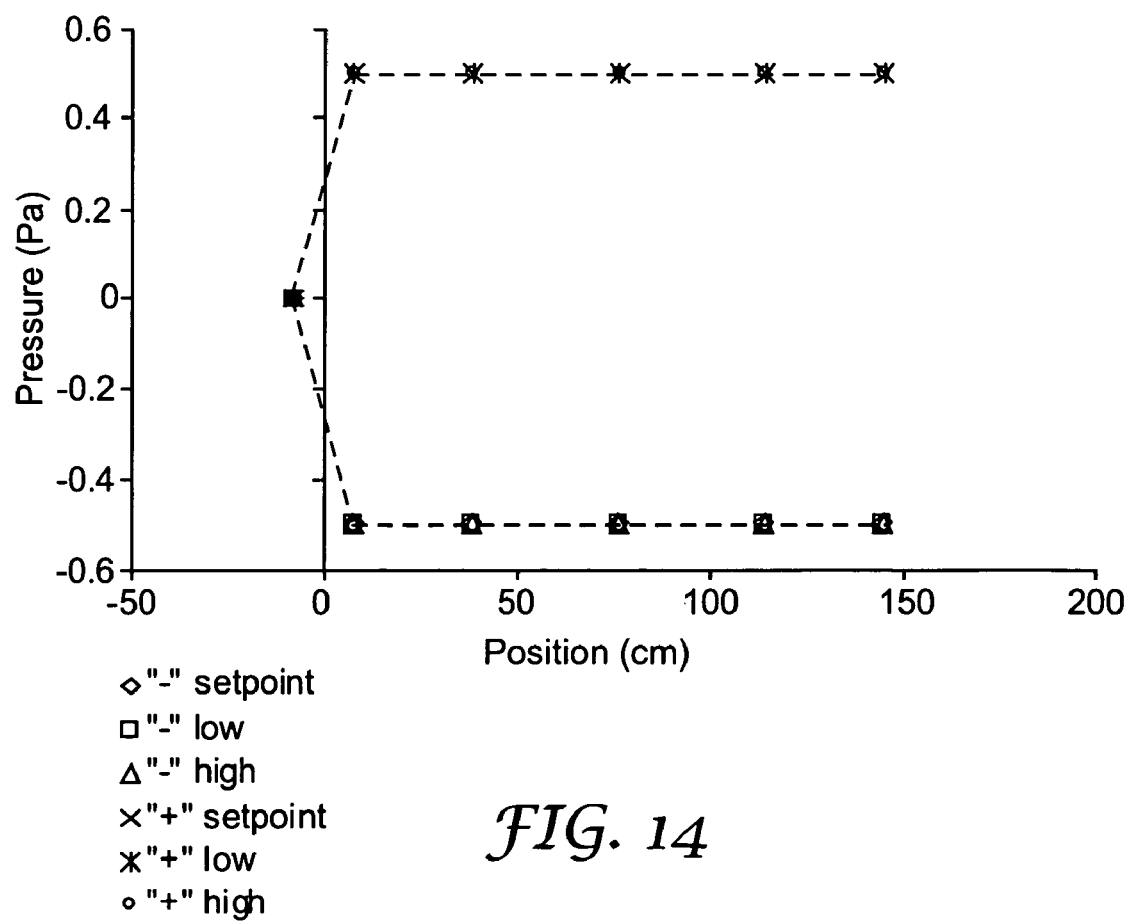
FIG. 14 is a graph showing pressures at various positions within a disclosed close-coupled enclosure.

Using the method of Example 1, a −0.5 Pa enclosure pressure was obtained in close-coupled enclosure 900 by adjusting the flow rates $M1'_U$ and $M1'_L$ to 24 liters/min and by adjusting the rate of gas withdrawal at outlet 932 to 94 liters/min. In a separate run, a +0.5 Pa enclosure pressure was obtained by adjusting the flow rates $M1'_U$ and $M1'_L$ to 122 liters/min and by adjusting the rate of gas withdrawal at outlet 932 to 94 liters/min. The respective particle counts were 107,889 at −0.5 Pa, and only 1 at +0.5 Pa. For each run the enclosure pressure above the substrate was measured at several points along the length of close-coupled enclosure 900 using holes 2, 5, 8, 11 and 14 (see FIG. 10). As shown in FIG. 14, the enclosure pressure above the substrate was very steady for each run and did not measurably vary along the length of close-coupled enclosure 900. Similar measurements were made below the web using ports A, B and C. No variation in pressure was observed in those measurements either.

Figure 15:
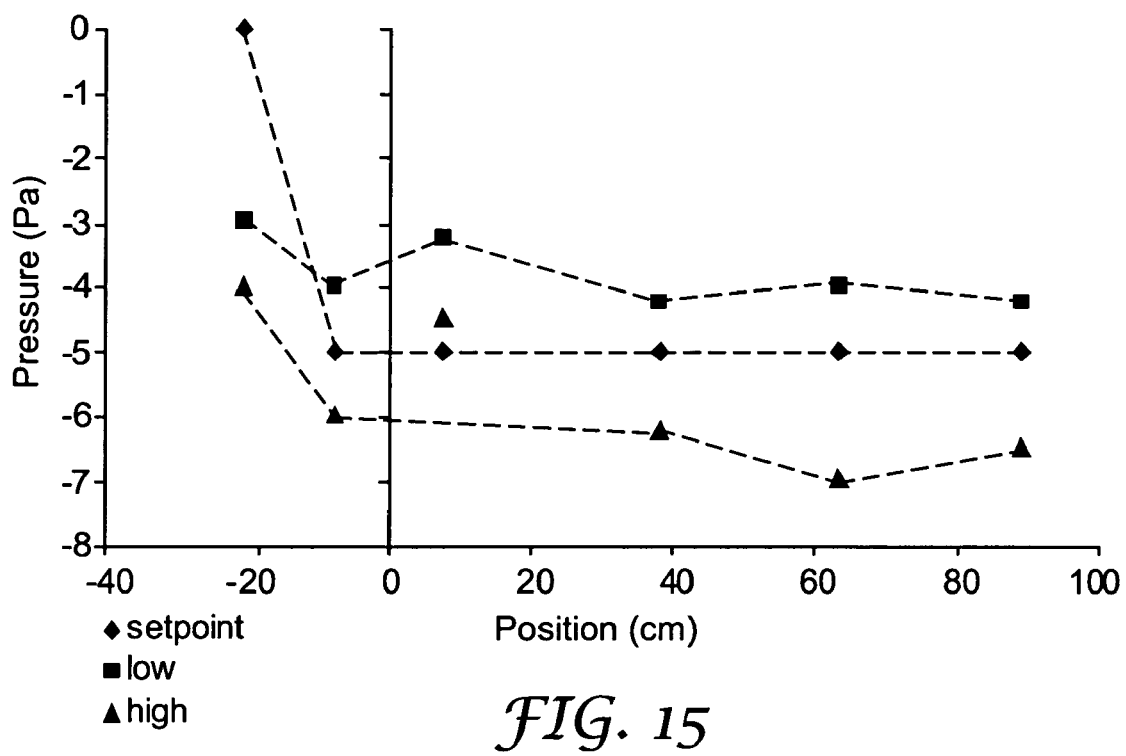
FIG. 15 is a graph showing pressures at various positions inside and outside a conventional oven.

In a comparison run, pressure measurements were made at varying points inside and outside a TEC™ air flotation oven (manufactured by Thermal Equipment Corp.) equipped with a HEPA filter air supply set to maintain a −0.5 Pa enclosure pressure. The upper and lower flotation air bar pressures were set to 250 Pa. The make-up air flowed at 51,000 liters/min (equivalent to about 7.5 air changes/minute for a 6800 liter oven capacity, not taking into account equipment inside the oven). The ambient room air particle count was 48,467. The particle count measured approximately 80 centimeters inside the oven was 35,481. The particle counts at several other positions were measured as shown in FIG. 15. FIG. 15 demonstrates that the enclosure pressure varied considerably at the various measuring points, and exhibited further variation due to the action of the oven pressure regulator.

EXAMPLE 4

Figure 16:
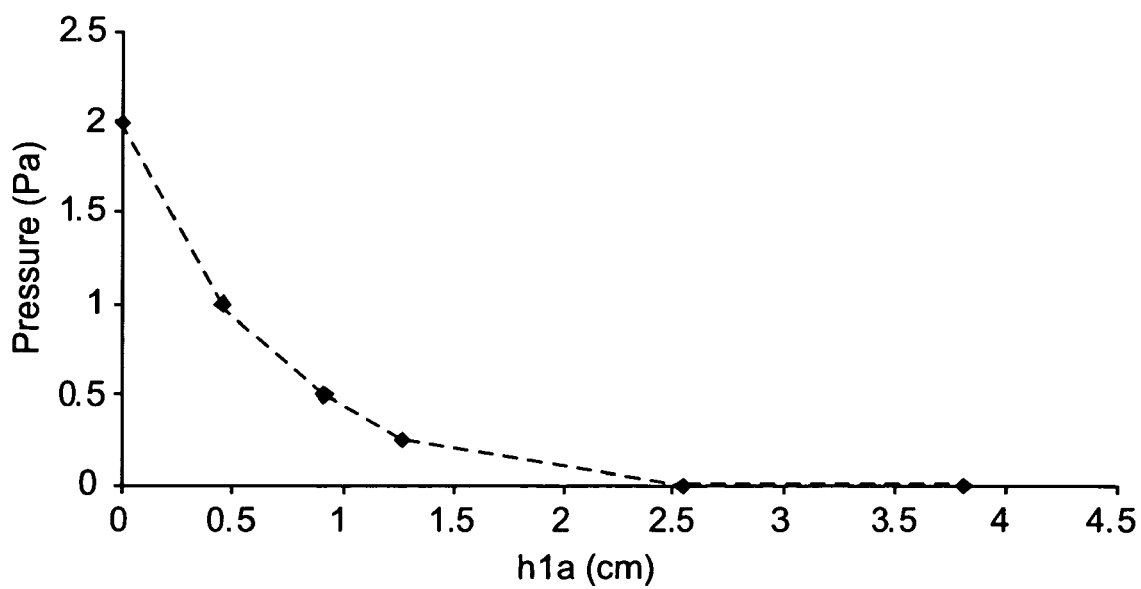
FIG. 16 is a graph showing pressure versus web slot height for a disclosed close-coupled enclosure.
Figure 17:
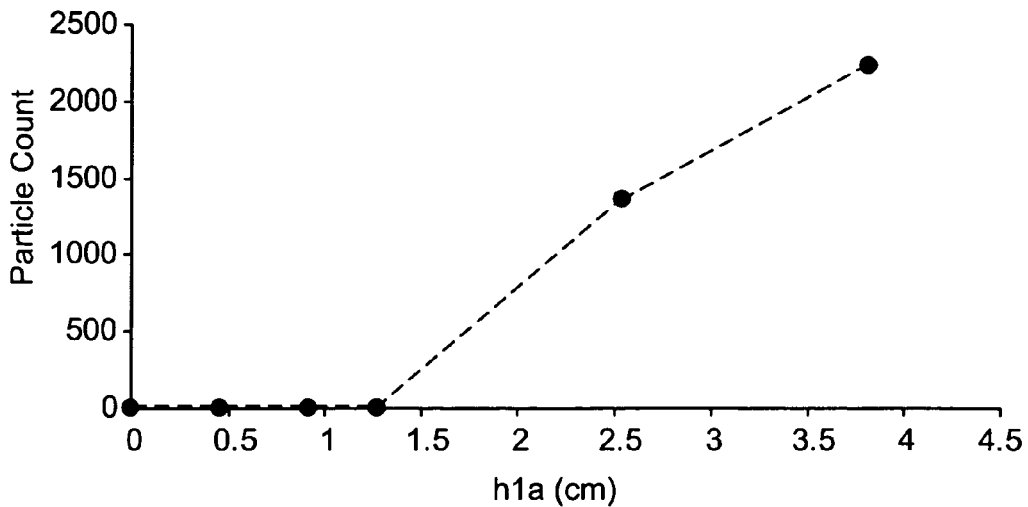
FIG. 17 is a graph showing particle count versus web slot height for a disclosed close-coupled enclosure.

Using the general method of Example 1, the $M1'_U$ and $M1'_L$ flow rates were set at 122 liters/min and the rate of gas withdrawal at outlet 932 was set at 94 liters/min. The web slot height $h_{1a}$ was adjusted to values of 0, 0.46, 0.91, 1.27, 2.54 and 3.81 cm. The ambient air particle count was 111,175. FIG. 16 and FIG. 17 (which both use linear vertical axis scales) respectively show the pressure and particle count inside the enclosure at various web slot heights. In all instances, a material particle count reduction (compared to the ambient air particle count) was obtained.

EXAMPLE 5

Figure 18:
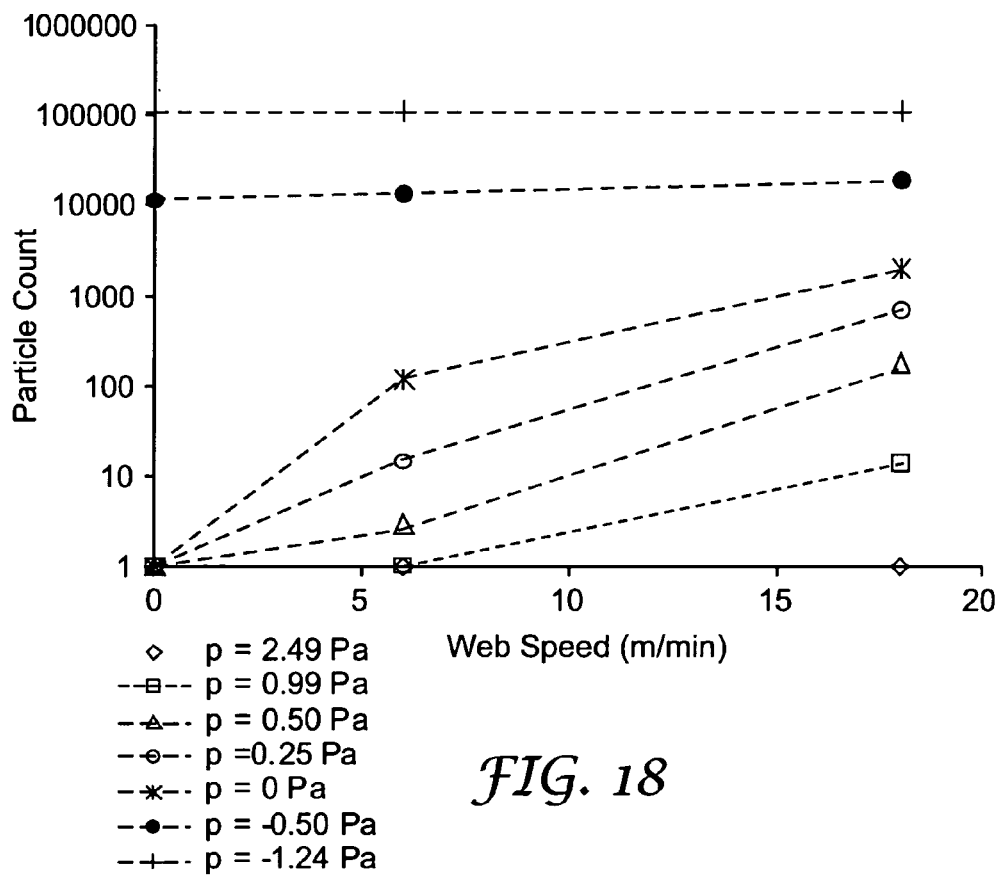
FIG. 18 is a graph showing particle count versus web speed at various pressures for a disclosed close-coupled enclosure.

Using the general method of Example 1 and a 23 cm wide polyester film substrate moving at 0, 6 or 18 m/min, the $M1'_U$ and $M1'_L$ flow rates and the rate of gas withdrawal at outlet 932 were adjusted to obtain varying enclosures pressures. The ambient air particle count was 111,175. The enclosure particle count was measured as a function of web speed and enclosure pressure. The results are shown in FIG. 18 (which uses a logarithmic particle count scale). FIG. 18 demonstrates that material particle count reductions were obtained for all measured substrate speeds at, e.g., pressures greater than −0.5 Pa.

From the above disclosure of the general principles of the disclosed invention and the preceding detailed description, those skilled in this art will readily comprehend the various modifications to which the disclosed invention is susceptible. Therefore, the scope of the invention should be limited only by the following claims and equivalents thereof.

We claim:

1. A process for coating a moving web substrate passing from an unwind reel to a takeup reel comprising conveying the substrate past a coating applicator and from the coating applicator to and through a dryer or curing station in a close-coupled enclosure or series of close-coupled enclosures while supplying the enclosure or series of enclosures with one or more streams of conditioned gas flowing at a rate sufficient to reduce materially the particle count in a close-coupled enclosure.

2. A process according to claim 1 comprising conveying the substrate from the coating applicator through the dryer and curing station in a close-coupled enclosure or series of close-coupled enclosures.

3. A process for coating a moving web substrate passing from an unwind reel to a takeup reel comprising conveying the substrate in a close-coupled enclosure or series of close-coupled enclosures from a pre-coating station to a coating applicator, and past the coating applicator to a dryer or curing station in a close-coupled enclosure or series of interconnected close-coupled enclosures while supplying the enclosure or series of enclosures with one or more streams of conditioned gas flowing at a rate sufficient to reduce materially the particle count in a close-coupled enclosure.

4. A process for coating a moving web substrate passing from an unwind reel to a takeup reel comprising conveying the substrate in a close-coupled enclosure or series of close-coupled enclosures from a pre-coating station past a coating applicator and to and through a dryer or curing station while supplying the enclosure or series of enclosures with one or more streams of conditioned gas flowing at a rate sufficient to reduce materially the particle count in a close-coupled enclosure.

5. A process for coating a moving substrate of indefinite length comprising conveying the substrate in a close-coupled enclosure or series of close-coupled enclosures from a cabinet containing an unwind reel, past a coating applicator, to a dryer or curing station and to a cabinet containing a takeup reel while supplying the enclosure or series of enclosures with one or more streams of conditioned gas flowing at a rate sufficient to reduce materially the particle count in a close-coupled enclosure.

6. A process for coating a moving web substrate passing from an unwind reel to a takeup reel comprising conveying the substrate past a coating applicator and to a dryer or curing station in a close-coupled enclosure or series of interconnected close-coupled enclosures while supplying the enclosure or series of enclosures with one or more streams of conditioned gas flowing at a rate sufficient to reduce materially the particle count in a close-coupled enclosure, coating the substrate and protecting it from particulate contamination until the coating can solidify.

7. A process for coating a moving web substrate passing from an unwind reel to a takeup reel comprising conveying the substrate past a coating applicator and to a dryer or curing station in a close-coupled enclosure or series of interconnected close-coupled enclosures while supplying the enclosure or series of enclosures with one or more streams of conditioned gas flowing at a rate sufficient to reduce materially the particle count in a close-coupled enclosure, coating the substrate and not exposing it to ambient air from at least the time the coating is applied until the coating solidifies.

8. A process for coating a moving web substrate passing from an unwind reel to a takeup reel comprising conveying the substrate past a coating applicator and to a dryer or curing station in a close-coupled enclosure or series of interconnected close-coupled enclosures while supplying the enclosure or series of enclosures with one or more streams of conditioned gas flowing at a rate sufficient to reduce materially the particle count in a close-coupled enclosure, and further comprising connecting first and second enclosures having a material difference in their respective operating pressures via a close-coupled enclosure comprising a transition zone.

9. A process for coating a moving substrate of indefinite length comprising conveying the substrate past a coating applicator and to a dryer or curing station in a close-coupled enclosure or series of interconnected close-coupled enclosures while supplying the enclosure or series of enclosures with one or more streams of conditioned gas flowing at a rate sufficient to reduce materially the particle count in a close-coupled enclosure, and further comprising connecting first and second enclosures having a material difference in their respective operating pressures via a close-coupled enclosure comprising a transition zone, wherein the first enclosure comprises a close-coupled enclosure, the second enclosure comprises an oven and there is a ten-fold or greater pressure difference between atmospheres in the first and second enclosures.

10. A process for coating a moving substrate of indefinite length comprising conveying the substrate past a coating applicator and to a dryer or curing station in a close-coupled enclosure or series of interconnected close-coupled enclosures while supplying the enclosure or series of enclosures with one or more streams of conditioned gas flowing at a rate sufficient to reduce materially the particle count in a close-coupled enclosure, wherein the total of the average headspace and average footspace in a close-coupled enclosure is 10 cm or less.

11. A process according to claim 10 wherein the total of the average headspace and average footspace in a close-coupled enclosure is 5 cm or less.

12. A process according to claim 10 wherein the total of the average headspace and average footspace in any close-coupled enclosure is 3 cm or less.

13. A process for coating a moving substrate of indefinite length comprising conveying the substrate past a coating applicator and to a dryer or curing station in a close-coupled enclosure or series of interconnected close-coupled enclosures while supplying the enclosure or series of enclosures with one or more streams of conditioned gas flowing at a rate sufficient to reduce materially the particle count in a close-coupled enclosure, wherein a first chamber having a gas introduction device is positioned near a control surface, a second chamber having a gas withdrawal device is positioned near the control surface, the control surface and first and second chambers together define a region wherein adjacent gas phases possess an amount of mass, at least a portion of the mass from the adjacent gas phases is transported through the gas withdrawal device by inducing a flow through the region, and the mass flow can be segmented into the following components:

M1 means total net time-average mass flow per unit of substrate width into or out of the region resulting from pressure gradients, M1' means the total net time-average mass flow of a gas per unit width into the region through the first chamber from the gas introduction device, M2 means the time-average mass flow of conditioned gas per unit width from or into the at least one major surface of the substrate or coating into or from the region, M3 means total net time-average mass flow per unit width into the region resulting from motion of the material, and M4 means time-average rate of mass transport trough the gas withdrawal device per unit width, wherein M1 has a value less than zero and greater than −0.25 kg/second/meter.

14. A process according to claim 13 wherein M1 has a value less than zero and greater than −0.10 kg/second/meter.

15. An apparatus for coating a moving web substrate passing from an unwind reel to a takeup reel comprising a coating applicator, dryer or curing station and substrate-handling equipment for conveying the substrate past the coating applicator and through the dryer or curing station, the substrate being enveloped from at least the coating applicator to the dryer or curing station in a close-coupled enclosure or series of close-coupled enclosures supplied with one or more streams of conditioned gas flowing at a rate sufficient to reduce materially the particle count in a close-coupled enclosure.

16. An apparatus according to claim 15 wherein the substrate is enveloped from the coating applicator through the dryer or curing station in a close-coupled enclosure or series of close-coupled enclosures.

17. An apparatus according to claim 15 wherein the substrate is enveloped from the coating applicator through the dryer and curing station in a close-coupled enclosure or series of close-coupled enclosures.

18. An apparatus according to claim 15 wherein the substrate is enveloped in a close-coupled enclosure or series of close-coupled enclosures from a pre-coating station to the coating applicator.

19. An apparatus according to claim 15 wherein the substrate is enveloped in a close-coupled enclosure or series of close-coupled enclosures from a pre-coating station through the dryer or curing station.

20. An apparatus according to claim 15 wherein an unsolidified coating on the substrate is protected from particulate contamination until the coating can solidify.

21. An apparatus according to claim 15 wherein the substrate is coated and not exposed to ambient air from at least the time the coating is applied until the coating solidifies.

22. An apparatus according to claim 15 wherein at least two close-coupled enclosures have different average headspaces or avenge footspaces.

23. An apparatus according to claim 15 wherein a conditioned gas stream is supplied to at least the first in a series of interconnected close-coupled enclosures and the conditioned gas is carried along with the moving substrate to a downstream close-coupled enclosure or pushed to an upstream enclosure or process.

24. An apparatus according to claim 15 wherein conditioned gas streams are supplied to a plurality of close-coupled enclosures and gas streams are withdrawn from a plurality of close-coupled enclosures.

25. An apparatus according to claim 15 wherein conditioned gas streams are supplied to each in a series of interconnected close-coupled enclosures.

26. An apparatus according to claim 15 having seals with respect to the moving substrate at the upstream and downstream ends of a series of interconnected close-coupled enclosure.

27. An apparatus according to claim 15 wherein a close-coupled enclosure has a pressure gradient of at least about −0.5 Pa or higher.

28. An apparatus according to claim 15 wherein a close-coupled enclosure has a positive pressure gradient.

29. An apparatus according to claim 15 comprising first and second enclosures having a material difference in their respective operating pressures connected by a close-coupled enclosure comprising a transition zone between the first and second enclosures.

30. An apparatus for coating a moving substrate of indefinite length comprising a coating applicator, dryer or curing station and substrate-handling equipment for conveying the substrate vast the coating applicator and through the dryer or curing station, the substrate being enveloped from at least the coating applicator to the dryer or curing station in a close-coupled enclosure or series of close-coupled enclosures supplied with one or more streams of conditioned gas flowing at a rate sufficient to reduce materially the particle count in a close-coupled enclosure, wherein the substrate is enveloped in a close-coupled enclosure or series of close-coupled enclosures from a cabinet containing the unwind reel to a cabinet containing the takeup reel.

31. An apparatus for coating a moving substrate of indefinite length comprising a coating applicator, dryer or curing station and substrate-handling equipment for conveying the substrate past the coating applicator and through the dryer or curing station, the substrate being enveloped from at least the coating applicator to the dryer or curing station in a close-coupled enclosure or series of close-coupled enclosures supplied with one or more streams of conditioned gas flowing at a rate sufficient to reduce materially the particle count in a close-coupled enclosure, the apparatus comprising first and second enclosures having a material difference in their respective operating pressures connected by a close-coupled enclosure comprising a transition zone between the first and second enclosures, wherein the first enclosure comprises a close-coupled enclosure, the second enclosure comprises an oven and there is a ten-fold or greater pressure difference between atmospheres in the first and second enclosures.

32. An apparatus for coating a moving substrate of indefinite length comprising a coating applicator, dryer or curing station and substrate-handling equipment for conveying the substrate past the coating applicator and through the dryer or curing station, the substrate being enveloped from at least the coating applicator to the dryer or curing station in a close-coupled enclosure or series of close-coupled enclosures supplied with one or more streams of conditioned gas flowing at a rate sufficient to reduce materially the particle count in a close-coupled enclosure, wherein the total of the average headspace and average footspace in a close-coupled enclosure is 10 cm or less.

33. An apparatus according to claim 32 wherein the total of the average headspace and average footspace in a close-coupled enclosure is 5 cm or less.

34. An apparatus according to claim 32 wherein the total of the average headspace and avenge footspace in any close-coupled enclosure is 3 cm or less.

35. An apparatus for coating a moving substrate of indefinite length comprising a coating applicator, dryer or curing station and substrate-handling equipment for conveying to substrate past the coating applicator and through the dryer or curing station, the substrate being enveloped from at least the coating applicator to the dryer or curing station in a close-coupled enclosure or series of close-coupled enclosures supplied with one or more streams of conditioned gas flowing at a rate sufficient to reduce materially the particle count in a close-coupled enclosure, wherein a first chamber having a gas introduction device is positioned near a control surface, a second chamber having a gas withdrawal device is positioned near the control surface, the control surface and first and second chambers together define a region wherein adjacent gas phases possess an amount of mass, at least a portion of the mass from the adjacent gas phases can be transported through the gas withdrawal device by inducing a flow through the region, and the mass flow can be segmented into the following components:

M1 means total net time-avenge mass flow per unit of substrate width into or out of the region resulting from pressure gradients, M1' means the total net time-average mass flow of a gas per unit width into the region through the first chamber from the gas introduction device, M2 means the time-average mass flow of conditioned gas per unit width from or into the at least one major surface of the substrate or coating into or from the region, M3 means total net time-average mass flow per unit width into the region resulting from motion of the material, and M4 means time-average rate of mass transport through the gas withdrawal device per unit width.

36. An apparatus according to claim 35 wherein M1 has a value less than zero and greater than −0.25 kg/second/meter.

37. An apparatus according to claim 35 wherein M1 has a value less than zero and greater than −0.10 kg/second/meter.

38. An apparatus for coating a moving substrate of indefinite length comprising a coating applicator, dryer or curing station and substrate-handling equipment for conveying the substrate past the coating applicator and through the dryer or curing station, the substrate being enveloped from at least the coating applicator to the dryer or curing station in a close-coupled enclosure or series of close-coupled enclosures supplied with one or more streams of conditioned gas flowing at a rate sufficient to reduce materially the particle count in a close-coupled enclosure, wherein a stream of conditioned gas flows at a rate sufficient to reduce a close-coupled enclosure particle count by 75% or more.

39. An apparatus according to claim 38 wherein the streams of conditioned gas flow at a rate sufficient to reduce the close-coupled enclosure particle counts by 90% or more.

40. An apparatus according to claim 39 wherein the total of the average headspace and average footspace in any close-coupled enclosure is 10 cm or less.

41. An apparatus according to claim 39 wherein the total of the average headspace and average footspace in any close-coupled enclosure is 3 cm or less.

42. An apparatus according to claim 39 wherein the total of the average headspace and average footspace in any close-coupled enclosure is 2 cm or less.

43. An apparatus according to claim 39 wherein the total of the average headspace and average footspace in any close-coupled enclosure is 1.5 cm or less.

44. An apparatus for coating a moving substrate of indefinite length comprising a coating applicator, dryer or curing station and substrate-handling equipment for conveying the substrate past the coating applicator and through the dryer or curing station, the substrate being enveloped from at least the coating applicator to the dryer or curing station in a close-coupled enclosure or series of close-coupled enclosures supplied with one or more streams of conditioned gas flowing at a rate sufficient to reduce materially the particle count in a close-coupled enclosure, wherein an enclosure or series of enclosures is supplied with one or more streams of conditioned gas distributed at a substantially uniform rate across the substrate width.

45. An apparatus according to claim 44 wherein the distributed streams of gas do not disturb the coating sufficiently to cause mottle or other defects.

46. An process for coating a moving substrate of indefinite length comprising conveying substrate past a coating applicator and from the coating applicator to and through a dryer or curing station in a close-coupled enclosure or series of close-coupled enclosures while supplying the enclosure or series of enclosures with one or more streams of conditioned gas flowing at a rate sufficient to reduce materially the particle count in a close-coupled enclosure, comprising flowing streams of conditioned gas at rates sufficient to reduce the close-coupled enclosure particle counts by 90% or more and wherein the total of the avenge headspace and average footspace in any close-coupled enclosure is 10 cm or less.

47. A process according to claim 46 wherein the total of the average headspace and avenge footspace in any close-coupled enclosure is 3 cm or less.

48. A process according to claim 46 wherein the total of the average headspace and average footspace in any close-coupled enclosure is 2 cm or less.

49. A process according to claim 46 wherein the total of the average headspace and average footspace in any close-coupled enclosure is 1.5 cm or less.

* * * * *

UNITED STATES PATENT AND TRADEMARK OFFICE
CERTIFICATE OF CORRECTION

| | | |
|---|---|---|
| PATENT NO. | : 7,032,324 B2 | Page 1 of 2 |
| APPLICATION NO. | : 10/810069 | |
| DATED | : April 25, 2006 | |
| INVENTOR(S) | : William B. Kolb | |

It is certified that error appears in the above-identified patent and that said Letters Patent is hereby corrected as shown below:

Column Page 2 Col. 2 (U.S. Patent Documents) – Line 7 - After "6,553,689" delete "B1" and insert -- B2 --, therefor.

Column Page 2 Col. 2 (U.S. Patent Documents) – Line 9 - After "6,656,017" delete "B1" and insert -- B2 --, therefor.

Column 1 – Line 12 - Delete "No." and insert -- Nos. --, therefor.

Column 9 – Line 31-32 - After "in" insert -- copending --,

Column 10 – Line 12 (Approx.) - Delete "M1" and insert -- $MI$ --, therefor.

Column 10 – Line 46 - Delete "GC" and insert -- $G_C$ --, therefor.

Column 10 – Line 49 - Delete "GC." and insert -- $G_C$. --, therefor.

Column 21 – Line 37 - In Claim 13, delete "trough" and insert -- through --, therefor.

Column 22 – Line 12 - In Claim 22, delete "avenge" and insert -- average --, therefor.

Column 22 – Line 43 - In Claim 30, delete "vast" and insert -- past --, therefor.

Column 23 – Line 20 - In Claim 34, delete "avenge" and insert -- average --, therefor.

Column 23 – Line 25 - In Claim 35, delete "to" and insert -- the --, therefor.

Column 23 – Line 41 - In Claim 35, delete "time–avenge " and insert -- time–average --, therefor.

Column 24 – Line 41- In Claim 46, delete "An" and insert -- A --, therefor.

Column 24 – Line 42 - In Claim 46, after "conveying" insert -- the --.

Column 24 – Line 51 - In Claim 46, delete "avenge" and insert -- average --, therefor.

UNITED STATES PATENT AND TRADEMARK OFFICE
CERTIFICATE OF CORRECTION

PATENT NO. : 7,032,324 B2
APPLICATION NO. : 10/810069
DATED : April 25, 2006
INVENTOR(S) : William B. Kolb It is certified that error appears in the above-identified patent and that said Letters Patent is hereby corrected as shown below:

Column 24 – Line 55 - In Claim 47, delete "avenge" and insert -- average --, therefor.

Signed and Sealed this

Seventh Day of November, 2006

JON W. DUDAS
*Director of the United States Patent and Trademark Office*